(12) United States Patent
Chen et al.

(10) Patent No.: US 9,167,248 B2
(45) Date of Patent: Oct. 20, 2015

(54) REFERENCE PICTURE LIST MODIFICATION FOR VIDEO CODING

(71) Applicant: QUALCOMM Incorporated, San Diego, CA (US)

(72) Inventors: Ying Chen, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 13/940,064

(22) Filed: Jul. 11, 2013

(65) Prior Publication Data

US 2014/0016699 A1    Jan. 16, 2014

Related U.S. Application Data

(60) Provisional application No. 61/671,609, filed on Jul. 13, 2012, provisional application No. 61/674,591, filed on Jul. 23, 2012, provisional application No. 61/702,109, filed on Sep. 17, 2012, provisional application No. 61/705,957, filed on Sep. 26, 2012.

(51) Int. Cl.
*H04N 7/12* (2006.01)
*H04N 11/02* (2006.01)
(Continued)

(52) U.S. Cl.
CPC ....... *H04N 19/00569* (2013.01); *H04N 19/573* (2014.11); *H04N 19/61* (2014.11); *H04N 19/70* (2014.11)

(58) Field of Classification Search
CPC ............ H04N 19/70; H04N 19/00569; H04N 19/573; H04N 19/61
USPC ..................................................... 375/240.12
See application file for complete search history.

(56) References Cited

U.S. PATENT DOCUMENTS

| 2013/0077687 A1 | 3/2013 | Wang et al. |
| 2013/0089134 A1 | 4/2013 | Wang et al. |

(Continued)

FOREIGN PATENT DOCUMENTS

WO    2012091640 A1    7/2012

OTHER PUBLICATIONS

International Preliminary Report on Patentability—PCT/US2013/050258, The International Bureau of WIPO—Geneva, Switzerland, Sep. 19, 2014, 10 pp.

(Continued)

*Primary Examiner* — Hee-Yong Kim
(74) *Attorney, Agent, or Firm* — Shumaker & Sieffert, P.A.

(57) ABSTRACT

A video decoder generates an initial reference picture list (RPL). Furthermore, the video decoder determines that an ordered set of reference picture list modification (RPLM) syntax elements does not include any additional syntax elements when a syntax element in the ordered set of RPLM syntax elements has a particular value. Furthermore, the video decoder generates a final RPL. For each respective RPLM syntax element in the ordered set of syntax elements, when the respective RPLM syntax element does not have the particular value, the final RPL includes, at an insertion position for the respective RPLM syntax element, a particular reference picture. The respective syntax element indicates a position in the initial RPL of the particular RPLM reference picture. The insertion position for the respective RPLM syntax element corresponds to a position in the ordered set of RPLM syntax elements of the respective RPLM syntax element.

28 Claims, 7 Drawing Sheets

(51) Int. Cl.
*H04N 11/04* (2006.01)
*H04N 15/00* (2006.01)
*H04N 13/00* (2006.01)
*H04N 19/50* (2014.01)
*H04N 19/70* (2014.01)
*H04N 19/61* (2014.01)
*H04N 19/573* (2014.01)

(56) References Cited

U.S. PATENT DOCUMENTS

2013/0114742 A1  5/2013  Hannuksela et al.
2013/0271571 A1* 10/2013 Wu et al. .................... 348/43

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "3D-HEVC HLS: reference picture list modification", MPEG Meeting; Apr. 30, 2012-May 4, 2012; Geneva; (Motion Picture Expert Group or ISO/IEC JTC1/SC291WG11 ), No. m24944, XP030053287, 9 pp.
International Search Report and Written Opinion—PCT/US2013/050258—ISA/EPO—Nov. 4, 2013, 13 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Ramasubramonian, et al., "AHG15: On Reference Picture List Modification", 100. MPEG Meeting; Apr. 30, 2012-May 4, 2012; Geneva; (Motion Picture Expert Group or ISO/IEC JTC1/SC29/WG11),, No. m24595, XP030052938, 4 pp.
Sjoberg, et al., "Common Conditions for Reference Picture Marking and List Construction Proposals", JCT-VC Meeting; MPEG Meeting; Jul. 11, 2012-Jul. 20, 2012; Stockholm (Joint Collaborative Team on Video Coding of ISO/IEC JTC1/SC29/WG11 and ITU-T SG.16); URL: http://wftp3.itu.int/av-arch/jctvc-site/, No. JCTVC-J0513, XP030112875, 16 pp.
Sjoberg, et al., "Overview of HEVC High-Level Syntax and Reference Picture Management," IEEE Transactions on Circuits and Systems for Video Technology, vol. 22 (12), Dec. 2012, pp. 1858-1870.
Wahadaniah, et al., "AHG21: Signaling Periodic Reference Picture Lists", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SC.16); URL: http://wftp3.itu.int/av-arch/jctvc-site/, No. JCTVC-H0467, XP030111494, 6 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Response to Written Opinion datd Nov. 4, 2013, from International Application No. PCT/US2013/050258, filed on Jan. 20, 2014, 13 pp.
Second Written Opinion from International Application No. PCT/US2013/050258, dated Jun. 17, 2014, 8 pp.
Response to Second Written Opinion dated Jun. 17, 2014, from International Application No. PCT/US2013/050258, filed on Jul. 17, 2014, 8 pp.

* cited by examiner

REFERENCE PICTURE LIST MODIFICATION FOR VIDEO CODING

REFERENCE PICTURE LIST MODIFICATION FOR VIDEO CODING

This application claims the benefit of U.S. Provisional Patent Application No. 61/671,609, filed Jul. 13, 2012, U.S. Provisional Patent Application No. 61/674,591, filed Jul. 23, 2012, U.S. Provisional Patent Application No. 61/702,109, filed Sep. 17, 2012, and U.S. Provisional Patent Application No. 61/705,957, filed Sep. 26, 2012, the entire content of each of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques for constructing reference picture lists. In particular, a video decoder generates an initial version of a reference picture list. Furthermore, the video decoder obtains, from a bitstream, an ordered set of one or more syntax elements. The video decoder determines that the ordered set of syntax elements does not include any additional syntax elements when a syntax element in the ordered set of syntax elements has a particular value. Furthermore, the video decoder performs a reference picture list modification (RPLM) process to generate a final version of the reference picture list. For each respective syntax element in the ordered set of syntax elements, when the respective syntax element does not have the particular value, the final version of the reference picture list includes, at an insertion position for the respective syntax element, a particular reference picture. The respective syntax element indicates a position in the initial version of the reference picture list of the particular reference picture. The insertion position for the respective syntax element corresponds to a position in the ordered set syntax elements of the respective syntax element.

In one example, this disclosure describes a method of decoding video data, the method comprising: generating an initial version of a reference picture list; determining that an RPLM syntax element is the last RPLM syntax element in an ordered set of one or more RPLM syntax elements when the RPLM syntax element has a particular value; and generating a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element, wherein the respective RPLM syntax element indicates a position in the initial version of the reference picture list of the reference picture associated with the respective RPLM syntax element, and wherein the insertion position for the respective RPLM syntax element corresponds to a position in the ordered set of RPLM syntax elements of the respective RPLM syntax element.

In another example, this disclosure describes a video decoding device comprises one or more processors configured to: generate an initial version of a reference picture list; determine that an RPLM syntax element is the last RPLM syntax element in an ordered set of one or more RPLM syntax elements when the RPLM syntax element has a particular value; and generate a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element, wherein the respective RPLM syntax element indicates a position in the initial version of the reference picture list of the reference picture associated with the respective RPLM syntax element, and wherein the insertion position for the respective RPLM syntax element corresponds to a position in the ordered set of RPLM syntax elements of the respective RPLM syntax element.

In another example, this disclosure describes a video decoding device comprising: means for generating an initial version of a reference picture list; means for determining that an RPLM syntax element is the last RPLM syntax element in an ordered set of one or more RPLM syntax elements when the RPLM syntax element has a particular value; and means for generating a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element, wherein the respective RPLM syntax element indicates a position in the initial version of the reference picture list of the reference picture associated with the respective RPLM syntax element, and wherein the insertion position for the respective RPLM syntax element corresponds to a position in the ordered set of RPLM syntax elements of the respective RPLM syntax element.

In another example, this disclosure describes a computer-readable data storage medium that stores instructions that, when executed, configure a video decoding device to: generate an initial version of a reference picture list; determine that an RPLM syntax element is the last RPLM syntax element in an ordered set of one or more RPLM syntax elements when the RPLM syntax element has a particular value; and generate a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element, wherein the respective RPLM syntax element indicates a position in the initial version of the reference picture list of the reference picture associated with the respective RPLM syntax element, and wherein the insertion position for the respective RPLM syntax element corresponds to a position in the ordered set of RPLM syntax elements of the respective RPLM syntax element.

In another example, this disclosure describes a method of encoding video data, the method comprising: generating an ordered set of one or more RPLM syntax elements, wherein for each respective RPLM syntax element in the ordered set of RPLM syntax elements: when the respective RPLM syntax element is the last RPLM syntax element in the ordered set of RPLM syntax elements, the respective RPLM syntax element has a particular value, when the respective RPLM syntax element does not have the particular value, the respective RPLM syntax element indicates that a final version of a reference picture list includes, at an insertion position for the respective RPLM syntax element, a particular reference picture, wherein the respective RPLM syntax element indicates a position, within an initial version of the reference picture list, of the particular reference picture, and wherein the insertion position for the respective RPLM syntax element corresponds to a position in the ordered set of RPLM syntax elements of the respective RPLM syntax element; and generating a bitstream that includes the ordered set of one or more RPLM syntax elements.

In another example, this disclosure describes a video encoding device comprising one or more processors configured to: generate an ordered set of one or more RPLM syntax elements, wherein for each respective RPLM syntax element in the ordered set of RPLM syntax elements: when the respective RPLM syntax element is the last RPLM syntax element in the ordered set of RPLM syntax elements, the respective RPLM syntax element has a particular value, when the respective RPLM syntax element does not have the particular value, the respective RPLM syntax element indicates that a final version of a reference picture list includes, at an insertion position for the respective RPLM syntax element, a particular reference picture, wherein the respective RPLM syntax element indicates a position, within an initial version of the reference picture list, of the particular reference picture, and wherein the insertion position for the respective RPLM syntax element corresponds to a position in the ordered set of RPLM syntax elements of the respective RPLM syntax element; and generate a bitstream that includes the ordered set of one or more RPLM syntax elements.

In another example, this disclosure describes a video encoding device comprising: means for generating an ordered set of one or more RPLM syntax elements, wherein for each respective RPLM syntax element in the ordered set of RPLM syntax elements: when the respective RPLM syntax element is the last RPLM syntax element in the ordered set of RPLM syntax elements, the respective RPLM syntax element has a particular value, when the respective RPLM syntax element does not have the particular value, the respective RPLM syntax element indicates that a final version of a reference picture list includes, at an insertion position for the respective RPLM syntax element, a particular reference picture, wherein the respective RPLM syntax element indicates a position, within an initial version of the reference picture list, of the particular reference picture, and wherein the insertion position for the respective RPLM syntax element corresponds to a position in the ordered set of RPLM syntax elements of the respective RPLM syntax element; and means for generating a bitstream that includes the ordered set of one or more RPLM syntax elements.

In another example, this disclosure describes a computer-readable data storage medium that stores instructions that, when executed, configure a video encoding device to: generate an ordered set of one or more reference picture list modification (RPLM) syntax elements, wherein for each respective RPLM syntax element in the ordered set of RPLM syntax elements: when the respective RPLM syntax element is the last RPLM syntax element in the ordered set of RPLM syntax elements, the respective RPLM syntax element has a particular value, when the respective RPLM syntax element does not have the particular value, the respective RPLM syntax element indicates that a final version of a reference picture list includes, at an insertion position for the respective RPLM syntax element, a particular reference picture, wherein the respective RPLM syntax element indicates a position, within an initial version of the reference picture list, of the particular reference picture, and wherein the insertion position for the respective RPLM syntax element corresponds to a position in the ordered set of RPLM syntax elements of the respective RPLM syntax element; and generate a bitstream that includes the ordered set of one or more RPLM syntax elements.

The details of one or more examples of the disclosure are set forth in the accompanying drawings and the description below. Other features, objects, and advantages will be apparent from the description, drawings, and claims.

DETAILED DESCRIPTION

Figure 1:
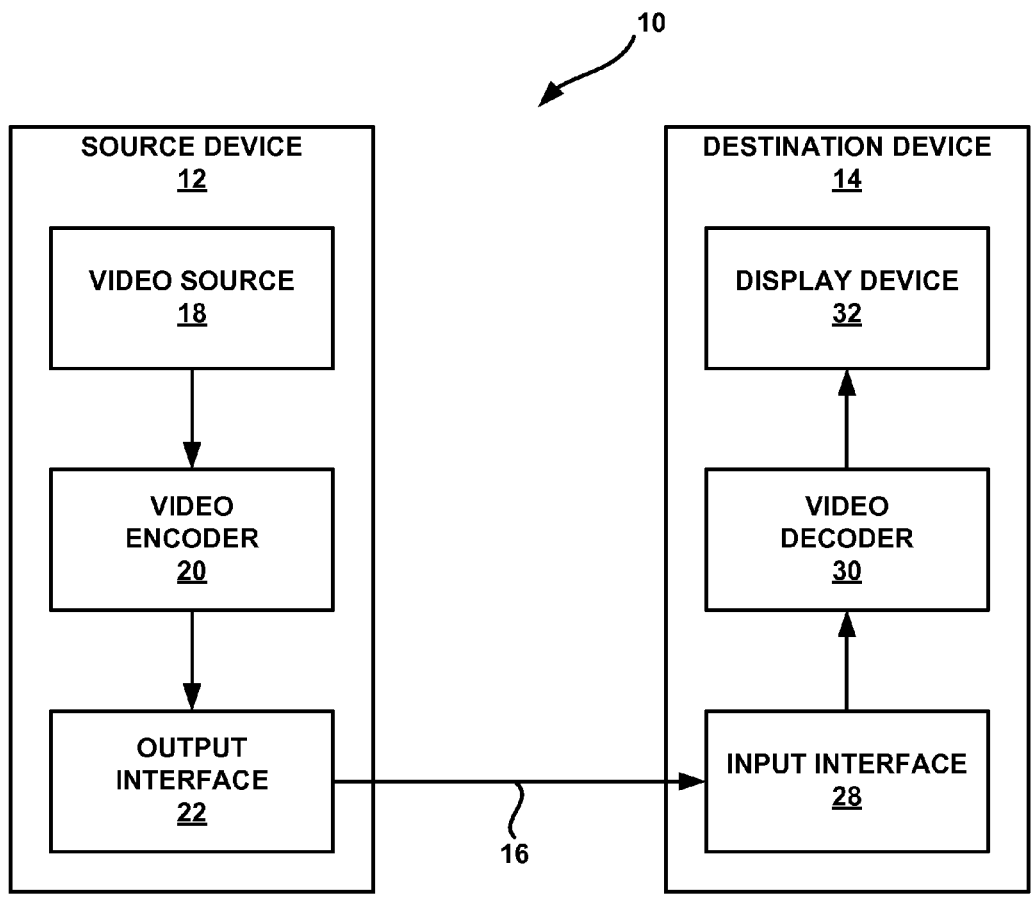
FIG. 1 is a block diagram illustrating an example video coding system that may utilize the techniques described in this disclosure.

When a video encoder encodes a picture, the video encoder may partition the picture into a set of coding blocks. The video encoder may partition each of the coding blocks into one or more prediction blocks. For each of the prediction blocks, the video encoder may use intra prediction or inter prediction to generate a corresponding predictive block. When the video encoder uses intra prediction to generate a predictive block, the video encoder may generate the predictive block based on samples in the same picture as the corresponding prediction block. When the video encoder uses inter prediction to generate a predictive block, the video encoder may generate the predictive block based at least in part on samples (e.g., pixel-domain values) in one or more reference pictures. The video encoder may use the predictive block to generate residual data, which the video encoder may transform and entropy encode. The video encoder may output the entropy encoded residual data in a bitstream.

A video decoder may receive the bitstream. The video decoder may recover the residual data at least in part by entropy decoding the entropy-encoded residual data and applying an inverse transform to the entropy-decoded residual data. The video decoder may use intra prediction or inter prediction to generate one or more predictive blocks that correspond to the entropy-decoded residual data. The video decoder may reconstruct a coding block based at least in part on the recovered residual data and the one or more predictive blocks.

When the video encoder begins encoding a current picture, the video encoder may generate five subsets of reference pictures (i.e., reference picture subsets) for the current picture. These five reference picture subsets are: RefPicSetStCurrBefore, RefPicSetStCurrAfter, RefPicSetStFoll, RefPicSetLtCurr, and RefPicSetLtFoll. The reference pictures in RefPicSetStCurrBefore, RefPicSetStCurrAfter, RefPicSetStFoll are referred to as "short-term reference pictures" or "STRPs." The reference pictures in RefPicSetLtCurr and RefPicSetLtFoll are referred to as "long-term reference pictures" or "LTRPs." The video encoder may re-generate the five reference picture subsets for each picture.

Furthermore, when a current slice of the current picture is a P slice, the video encoder may use the reference pictures from the RefPicStCurrAfter, RefPicStCurrBefore, and RefPicStLtCurr reference picture subsets of the current picture to generate a single reference picture list (RefPicList0) for the current slice. When the current slice is a B slice, the video encoder may use the reference pictures from the RefPicStCurrAfter, RefPicStCurrBefore, and RefPicStLtCurr reference picture subsets of the current picture to generate two reference picture lists (RefPicList0 and RefPicList1) for the current slice.

When the video encoder uses inter prediction to generate a predictive block for a prediction unit (PU) of a coding unit (CU) of the current slice, the video encoder may generate the predictive block of the PU based on samples (e.g., pixel-domain values) within one or more reference pictures in one or more of the reference picture lists for the current slice. The video encoder may determine a residual block for the CU based in part on the predictive block for the PU. The video encoder may partition the residual block of the CU into one or more transform blocks. In addition, the video encoder may transform and quantize the residual values of each of the transform blocks. Transformed residual values are also referred to as transform coefficients. The video encoder may generate a bitstream that includes data indicating the transformed and quantized residual values for transform blocks.

When a video decoder decodes a current slice of the current picture, the video decoder may regenerate RefPicList0 and/or RefPicList1. The video decoder may use samples from one or more reference pictures in RefPicList0 and/or RefPicList1 to generate predictive blocks for PUs of the current slice. The video decoder may use data signaled in the bitstream to construct RefPicList0 and RefPicList1.

To generate RefPicList0, a video coder (e.g., a video encoder or a video decoder) may generate an initial, default version of RefPicList0. In the initial version of RefPicList0, reference pictures in RefPicSetStCurrBefore are listed first, followed by reference pictures in RefPicSetStCurrAfter, followed by reference pictures in RefPicSetLtCurr. Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr.

After the video coder generates the initial version of a reference picture list (e.g., RefPicList0 or RefPicList1), the video coder may modify the order of reference pictures in the reference picture list. That is, the video coder may perform a reference picture list modification (RPLM) process to modify the order of the reference pictures in the reference picture list. Specifically, the bitstream includes an ordered set (e.g., a series) of RPLM commands for the reference picture list. For each respective RPLM command in the series of RPLM commands, the final version of the reference picture list includes, at an insertion position for the respective RPLM command, a particular reference picture. The respective RPLM command indicates a position in the initial version of the reference picture list of the particular reference picture. The insertion position for the respective RPLM command corresponds to a position in the series of RPLM commands of the respective RPLM command. For example, if the respective RPLM command is the $2^{nd}$ RPLM command in the series of RPLM commands, the insertion position for the respective RPLM command is the $2^{nd}$ position in the final version of the reference picture list.

There may be several problems with the RPLM design described above. For example, the number of RPLM commands must match the number of entries in the final version of the reference picture list. Signaling an RPLM command for each entry in the final version of the reference picture list may be wasteful. For example, there may be five pictures in the initial version of reference picture list and only the first two entries in the initial list need to be swapped to get the final list. In the RPLM design described above, five RPLM commands are needed. This may lead to unnecessary signaling in the bitstream, which may increase bit consumption.

In accordance with one or more example techniques of this disclosure, a video decoder may obtain, from a bitstream, a series of one or more RPLM commands (e.g., syntax elements) for a reference picture list. As the video decoder decodes the RPLM commands from the bitstream, the video decoder may determine whether an RPLM command has a particular value. This particular value may be equal to the number of reference pictures in the final version of the reference picture list. If the RPLM command has the particular value, the video decoder may determine that the bitstream does not include data indicating any additional RPLM commands for the reference picture list. In other words, the video decoder may determine that an RPLM command is the last RPLM command in the series of RPLM commands when the RPLM command has the particular value. Thus, if the RPLM command has the particular value, the video coder is alerted to the fact that there are no additional RPLM commands in the series of RPLM commands. Because the video encoder is able to use an RPLM command having the particular value to alert the video coder to the fact that there are no additional RPLM commands in the series of RPLM commands, the video encoder does not need to signal an RPLM command for each reference picture in the reference picture list. Thus, the bitstream may include fewer RPLM commands than reference pictures in the reference picture list. This may result in a reduction in the number of bits in the bitstream.

However, if the RPLM command does not have the particular value, the video decoder may generate the final version of the reference picture list such that the final version of the reference picture list includes, at an insertion point for the RPLM command, a particular reference picture. The RPLM command indicates a position in the initial version of the reference picture list of the particular reference picture. In some examples, the RPLM command specifies an index to the position in the initial version of the reference picture list indicated by the RPLM command. The insertion point for the RPLM command corresponds to a position in the series of RPLM commands of the RPLM command. Furthermore, if the RPLM command does not have the particular value, the video decoder may proceed to decode, from the bitstream, a next RPLM command in the series of RPLM commands.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In the example of FIG. 1, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 5" is described in Bross et al., "WD5: Working Draft 5 of High Efficiency Video Coding," Joint Collaborative Team on Video Coding (JCT-VC) of ITU-T SG16 WP3 and ISO/IEC JTC1/SC29/WG11, 7$^{th}$ Meeting, Geneva, CH, November 2011, which as of Jul. 11, 2013, is available from http://phenix.int-evey.fr/jct/doc_end_user/documents/7_Geneva/wg11/JCTVC-G1103-v12.zip. Another draft of the upcoming HEVC standard, referred to as "HEVC Working Draft 8" is described in Bross et al., "High Efficiency Video Coding (HEVC) text specification draft 7," Joint Collaborative Team on Video Coding (JCT-VC) of ITU-T SG16 WP3 and ISO/IEC JTC1/SC29/WG11, 9$^{th}$ Meeting, Geneva, Switzerland, April-May 2012, which as of Jul. 11, 2013, is available from http://phenix.int-evry.fr/jct/doc_end_user/documents/9_Geneva/wg11/JCTVC-I1003-v5.zip. Another draft of the upcoming HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 11$^{th}$ Meeting, Stockholm, Sweden, July 2012, which as of Jul. 11, 2013, is available from http://phenix.int-evey.fr/jct/doc_end_user/documents/10_Stockholm/wg11/JCTVC-J1003-v8.zip.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first MV indicating a spatial displacement between a sample block of the PU and the first reference location and a second MV indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

When a video coder (e.g., video encoder 20 or video decoder 30) begins processing a current picture, the video encoder may determine five reference picture set (RPS) subsets for the current picture: RefPicSetStCurrBefore, RefPicSetStCurrAfter, RefPicSetFollBefore, RefPicSetLtFoll, RefPicSetLtCurr, and RefPicSetLtFoll. The union of these five RPS subsets for the current picture may be referred to herein as the RPS for the current picture. RefPicSetStCurrBefore may include short-term reference pictures that occur before the current picture in output order and are used for reference by the current picture. RefPicSetStFollBefore may include short-term reference pictures that occur before the current picture in output order and are not used for reference by the current picture. RefPicStCurrAfter may include short-term reference pictures that occur after the current picture in output order and are used for reference by the current picture. RefPicSetStFollAfter may include short-term reference pictures that occur after the current picture in output order and are not used for reference by the current picture. RefPicSetLtCurr may include long-term reference pictures that are used for reference by the current picture. RefPicSetLtFoll may include long-term reference pictures that are not used for reference by the current picture.

HEVC provides for several different slice types. These slice types include I slices, P slices, and B slices. In I slices, only intra prediction is allowed. In P slices, intra prediction and uni-directional inter prediction is allowed. In B slices, intra prediction, uni-directional inter prediction, and bi-directional inter prediction is allowed. When the video coder begins coding a slice of a picture, the video coder may initialize a first reference picture list (i.e., List 0). Furthermore, if the current slice is a B slice, the video coder may initialize a second reference picture list (i.e., List 1). This disclosure may refer to List 0 as "RefPicList0" and may refer to List 1 as "RefPicList1."

To generate RefPicList0, a video coder (e.g., a video encoder or a video decoder) may generate an initial version of RefPicList0. In the initial version of RefPicList0, reference pictures in RefPicSetStCurrBefore are listed first, followed by reference pictures in RefPicSetStCurrAfter, followed by reference pictures in RefPicSetLtCurr, if available. In the initial version of RefPicList0, short-term pictures with earlier output order (i.e., reference pictures in RefPicSetStCurrBefore) are firstly inserted into RefPicList0 in ascending order of picture order count (POC) distance to the current picture, then short-term pictures with later output order (i.e., reference pictures in RefPicSetStCurrAfter) are inserted into RefPicList0 in ascending order of POC distance to the current picture, and finally the long-term pictures (i.e., reference pictures in RefPicSetLtCurr) are inserted at the end. A POC distance is the difference between POC values for pictures. A POC is variable that is associated with each picture that indicates the position of the associated picture in output order relative to the output order positions of the other pictures in the same coded video sequence.

Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr. In the initial version of RefPicList1, short-term pictures with later output order (i.e., reference pictures in RefPicSetStCurrAfter) are firstly inserted into RefPicList1 in ascending order of POC distance to the current picture, then short-term pictures with earlier output order (i.e., reference pictures in RefPicSetStCurrBefore) are inserted into RefPicList1 in ascending order of POC distance to the current picture, and finally the long-term pictures (i.e., reference pictures in RefPicSetLtCurr) are inserted at the end. In this way, reference picture list initialization creates default List 0 and List 1 (if the slice is a B slice) based on three RPS subsets: RefPicSetStCurrBefore, RefPicSetStCurrAfter, and RefPicSetLtCurr.

The video coder may repeat the above process (reference pictures that have already been added to the reference picture list are added again) when the number of entries in a list is smaller than a target number of active reference pictures (signaled in the picture parameter set or slice header). The target number of active reference pictures is a value that may be signaled in the PPS or slice header. This value may indicate the target number of pictures to be included in a reference picture list. Thus, if the number of reference pictures in RefPicSetCurrBefore, RefPicSetCurrAfter, and RefPicSetLtCurr is less than the target number of active reference pictures, the video coder may include reference pictures from RefPicSetCurrBefore, RefPicSetCurrAfter, and/or RefPicSetLtCurr in the reference picture list multiple times. When the number of reference pictures is larger than the target number, the reference picture list is truncated. In other words, if the number of reference pictures in RefPicSetCurrBefore, RefPicSetCurrAfter, and RefPicSetLtCurr is greater than a target number of reference pictures in a reference picture list, the video coder may omit one or more reference pictures from RefPicSetCurrBefore, RefPicSetCurrAfter, and RefPicSetLtCurr from the reference picture list.

After the video coder generates the initial version of a reference picture list (e.g., RefPicList0 or RefPicList1), the video coder may modify the order of reference pictures in the reference picture list. That is, the video coder may perform a reference picture list modification (RPLM) process to modify the order of the reference pictures in the reference picture list.

Specifically, the bitstream may include a syntax element (e.g., ref_pic_list_modification_flag_l0) that indicates whether RefPicList0 is specified as a list of RPLM commands. Similarly, the bitstream may include a syntax element (e.g., ref_pic_list_modification_flag_l1) that indicates whether RefPicList1 is specified as a list of RPLM commands. If a syntax element (e.g., ref_pic_list_modification_flag_l0 or ref_pic_list_modification_flag_l1) specifies that a reference picture list (e.g., RefPicList0 or RefPicList1) is specified as a list of RPLM commands, the bitstream may include a series of RPLM commands for the reference picture list. Each of the RPLM commands may be a syntax element. The number of RPLM commands in the series of RPLM commands may be equal to the number of entries in the final version of the reference picture list.

For each respective RPLM command in the series of RPLM commands, the final version of the reference picture list includes, at an insertion position for the respective RPLM command, a particular reference picture. The respective RPLM command indicates a position in the initial version of the reference picture list of the particular reference picture. The insertion position for the respective RPLM command corresponds to a position in the series of RPLM commands of the respective RPLM command. For example, if the respective RPLM command is the $2^{nd}$ RPLM command in the series of RPLM commands, the insertion position for the respective RPLM command is the $2^{nd}$ position in the final version of the reference picture list.

In this way, after a reference picture list has been initialized, the reference picture list may be modified such that the reference pictures for the current picture may be arranged in any order, including the case where one particular reference picture may appear in more than one position in the list, based on the RPLM commands. When a flag (e.g., ref_pic_list_modification_flag_l0 or ref_pic_list_modification_flag_l1) that indicates if modifications are present or not is set to 1, a fixed number (equal to the target number of entries in the reference picture list) of commands are signaled, and each command inserts one entry for a reference picture list. A reference picture is identified in the command by the index to the list of reference pictures for the current picture derived from the RPS signaling.

In HEVC Working Draft 8, a slice header for the current slice may include an RPLM syntax structure that contains the RPLM commands. Table 1, below, indicates a syntax structure for RPLM commands.

TABLE 1

| ref_pic_list_modification( ) { | Descriptor |
|---|---|
|   if( slice_type == P \|\| slice_type == B ) { | |
|     ref_pic_list_modification_flag_l0 | u(1) |
|     if( ref_pic_list_modification_flag_l0 && | |
|     NumPocTotalCurr > 1 ) | |
|       for( i = 0; i <= | |
|       num_ref_idx_l0_active_minus1; i++ ) | |
|         list_entry_l0[ i ] | u(v) |
|   } | |
|   if( slice_type == B ) { | |
|     ref_pic_list_modification_flag_l1 | u(1) |
|     if( ref_pic_list_modification_flag_l1 && | |
|     NumPocTotalCurr > 1 ) | |
|       for( i = 0; i <= | |
|       num_ref_idx_l1_active_minus1; i++ ) | |
|         list_entry_l1[ i ] | u(v) |
|   } | |
| } | |

In the example of Table 1, above, and other syntax tables of this disclosure, syntax elements having descriptors of the form u(n), where n is a non-negative integer, are unsigned values of length n. When the descriptor is specified as u(v), the corresponding syntax element has a variable length. Furthermore, with regard to Table 1, the variable NumPocTotalCurr is set equal to NumPocStCurrBefore+NumPocStCurrAfter+NumPocLtCurr. NumPocStCurrBefore indicates the number of elements in RefPicSetStBefore. NumPocStCurrAfter indicates the number of elements in RefPicSetStAfter. NumPocLtCurr indicates the number of elements in RefPicSetLtCurr.

In Table 1, the ref_pic_list_modification_flag_l0 syntax element equal to 1 indicates that RefPicList0 is specified explicitly as a list of list_entry_l0[i] values. The ref_pic_list_modification_flag_l0 syntax element equal to 0 indicates that RefPicList0 is determined implicitly. The ref_pic_list_modification_flag_l1 syntax element equal to 1 indicates that RefPicList1 is specified explicitly as a list of list_entry_l1[i] values. The ref_pic_list_modification_flag_l1 syntax element equal to 0 indicates that RefPicList1 is determined implicitly.

Furthermore, in the example of Table 1, the list_entry_lX[i] syntax element (with X being equal to 0 or 1) specifies the index of the reference picture in RefPicSetCurrTempListX to be placed at the current position of reference picture list LX (with X being equal to 0 or 1). RefPicSetCurrTempListX is the initial version of RefPicListX. The value of X is the same for each of list_entry_lX, RefPicSetCurrTempListX, and LX. The length of the list_entry_lX[i] syntax element is Ceil(Log 2(NumPocTotalCurr)) bits. The value of list_entry_lX[i] is in the range of 0 to NumPocTotalCurr−1, inclusive. If the list_entry_lX[i] syntax element is not present, the list_entry_lX[i] syntax element may be inferred to be equal to 0.

As indicated above, the video coder may generate an initial version of RefPicList0 when the video coder begins coding a P or B slice. The initial version of RefPicList0 may be denoted RefPicListTemp0. In HEVC Working Draft 8, the video coder may use an operation described by the following pseudo-code to generate the initial version of RefPicList0.

```
rIdx = 0
while( rIdx < NumRpsCurrTempList0 ) {
    for( i = 0; i < NumPocStCurrBefore && rIdx <
    NumRpsCurrTempList0; rIdx++, i++ )
        RefPicListTemp0[ rIdx ] = RefPicSetStCurrBefore[ i ]
    for( i = 0; i < NumPocStCurrAfter && rIdx <
```

```
        NumRpsCurrTempList0; rIdx++, i++ )
        RefPicListTemp0[ rIdx ] = RefPicSetStCurrAfter[ i ]
    for( i = 0; i < NumPocLtCurr && rIdx <
    NumRpsCurrTempList0; rIdx++, i++ )
        RefPicListTemp0[ rIdx ] = RefPicSetLtCurr[ i ]
}
```

In the pseudo-code above, the variable NumRpsCurrTempList0 is set equal to Max(num_ref_idx_l0_active_minus1+1, NumPocTotalCurr). The variable num_ref_idx_l0_active_minus1 indicates the number of active reference pictures in RefPicList0 minus 1.

Furthermore, in HEVC Working Draft 8, RefPicList0 is constructed as follows:

```
for( rIdx = 0; rIdx ≤ num_ref_idx_l0_active_minus1; rIdx++)
    RefPicList0[ rIdx ] = ref_pic_list_modification_flag_l0 ?
        RefPicListTemp0[ list_entry_l0[ rIdx ] ] :
        RefPicListTemp0[ rIdx ]
```

Furthermore, the video coder may generate an initial version of RefPicList1 when the video coder begins coding a B slice. The initial version of RefPicList1 may be denoted RefPicListTemp1. In HEVC Working Draft 8, the video coder may use an operation described by the following pseudo-code to generate the initial version of RefPicList1.

```
rIdx = 0
while( rIdx < NumRpsCurrTempList1 ) {
    for( i = 0; i < NumPocStCurrAfter && rIdx <
    NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
    NumRpsCurrTempList1;   rIdx++, i++)
        RefPicListTemp1[ rIdx ] = RefPicSetStCurrBefore[ i ]
    for( i = 0; i < NumPocLtCurr && rIdx < NumRpsCurrTempList1;
    rIdx++, i++ )
        RefPicListTemp1[ rIdx ] = RefPicSetLtCurr[ i ]
}
```

In the pseudo-code above, the variable NumRpsCurrTempList1 is set equal to Max(num_ref_idx_l1_active_minus1+1, NumPocTotalCurr). The variable num_ref_idx_l1_active_minus1 indicates the number of active reference pictures in RefPicList1 minus 1.

Furthermore, in HEVC Working Draft 8, RefPicList1 is constructed as follows:

```
for( rIdx = 0; rIdx ≤ num_ref_idx_l1_active_minus1; rIdx++)
    RefPicList1[ rIdx ] = ref_pic_list_modification_flag_l1 ?
        RefPicListTemp1[ list_entry_l1[ rIdx ] ] :
        RefPicListTemp1[ rIdx ]
```

There are several problems with the RPLM technique described in HEVC Working Draft 8. For example, the RPLM design in HEVC Working Draft 5 follows the RPLM design in H.264/AVC in that the number of commands may be less than the number of commands needed for the RPLM in HEVC Working Draft 8. For example, in HEVC Working Draft 8, five pictures in the initial list are to be put in the final list, and only the first two entries in the initial list need to be swapped to get the final list. In the H.264/AVC design, only one command is, needed while for the design in HEVC WD8, five commands are needed. In another example, in HEVC Working Draft 8, five pictures may be put in the final reference picture list. In this example, a picture at the end of the initial reference picture list or not included in the initial reference picture list needs to be added at the first entry of the final reference picture list, the last entry is removed and the position of the other entries have their positions shifted by one. This example illustrates a typical case in some extension to HEVC, such as multi-view coding. Furthermore, the RPLM technique used in H.264/AVC also has one or more problems. For example, the RPLM technique used in H.264/AVC requires the comparison of POC values of the entries in the reference picture list, which may introduce unnecessary complexity or unnecessary memory accesses.

The techniques of this disclosure may resolve one or more of the problems described above. For instance, video decoder 30 may generate an initial version of a reference picture list and obtain, from a bitstream, an RPLM syntax element (e.g., a list_entry_lX[i] syntax element) in an ordered set of one or more RPLM syntax elements. Furthermore, video decoder 30 may determine that the RPLM syntax element is the last RPLM syntax element in the ordered set of RPLM syntax elements when the RPLM syntax element has a particular value. Video decoder 30 may generate a final version of the reference picture list. For each respective RPLM syntax element in the ordered set of RPLM syntax elements that does not have the particular value, the final version of the reference picture list includes, at an insertion position for the respective RPLM syntax element, a reference picture associated with the respective RPLM syntax element. The respective RPLM syntax element may indicate a position in the initial version of the reference picture list of the reference picture associated with the respective RPLM syntax element. The insertion position for the respective syntax element may correspond to a position in the ordered set of RPLM syntax elements of the respective RPLM syntax element.

Similarly, video encoder 20 may generate an ordered set of one or more RPLM syntax elements. For each respective RPLM syntax element in the ordered set of RPLM syntax elements, when the respective RPLM syntax element is the last RPLM syntax element in the ordered set of RPLM syntax elements, the respective RPLM syntax element has a particular value. When the respective RPLM syntax element does not have the particular value, the respective RPLM syntax element indicates that a final version of a reference picture list includes, at an insertion position for the respective RPLM syntax element, a particular reference picture. The respective RPLM syntax element indicates a position, within an initial version of the reference picture list, of the particular reference picture. The insertion position for the respective RPLM syntax element corresponds to a position in the ordered set of RPLM syntax elements of the respective RPLM syntax element. Furthermore, video encoder 20 may generate a bitstream that includes the ordered set of one or more RPLM syntax elements.

In some examples, the particular value mentioned above is equal to a total number of reference pictures in the final reference picture set. For example, video decoder 30 may determine a first RPS subset (e.g., RefPicSetStCurrBefore), a second RPS subset (e.g., RefPicSetStCurrAfter), and a third RPS subset (e.g., RefPicSetLtCurr) for a current picture. The first RPS subset includes STRPs that occur before the current picture in output order and are used for reference by the current picture, the second RPS subset includes STRPs that occur after the current picture in output order and are used for reference by the current picture, and the third RPS subset includes LTRPs used for reference by the current picture. As indicated above, video decoder 30 may generate, based on the first, second, and third RPS subsets, the initial version of a reference picture list. In this example, the particular value is equal to a total number of reference pictures in the first, second, and third RPS subsets (i.e., the total number of reference pictures in a set of reference pictures that includes the first, second, and third RPS subsets).

Thus, in accordance with one or more techniques of this disclosure, the maximum permissible value of list_entry_lX [i] may be extended by one such that when list_entry_lX[i] reaches the largest value, list_entry_lX[i] indicates the end of the reference picture list modification syntax table. Thus, the semantics of list_entry_lX[i] may be changed so that video encoder 20 signals fewer RPLM commands, and the modification syntax can also be simplified by not removing the duplicate entries in the list.

Furthermore, during the reference picture list reordering step of each RPLM command, the POC value of each entry is not checked. Rather, a list of index values to RefPicSetCurr-TempListX may be used. The list of index values may be the values specified by the list_entry_lX syntax elements. As indicated above, the list_entry_lX syntax elements indicate positions in RefPicSetCurrTempListX. The index values may be compared during the reference picture list reordering step. In accordance with one or more example techniques of this disclosure, a current target position is equal to i in an RPLM syntax table (i.e., an ordered set of RPLM syntax elements). Once the target index matches an existing index in the index list after position i, the remaining entries in RefPicListX with indexes between i (inclusive) and the matched position (exclusive) are shifted. The position i index is set to the value of list_entry_lX[i]. In this way, the video coder may shift, to later positions in RefPicListX, entries in RefPicListX that follow the target index.

Figure 2:
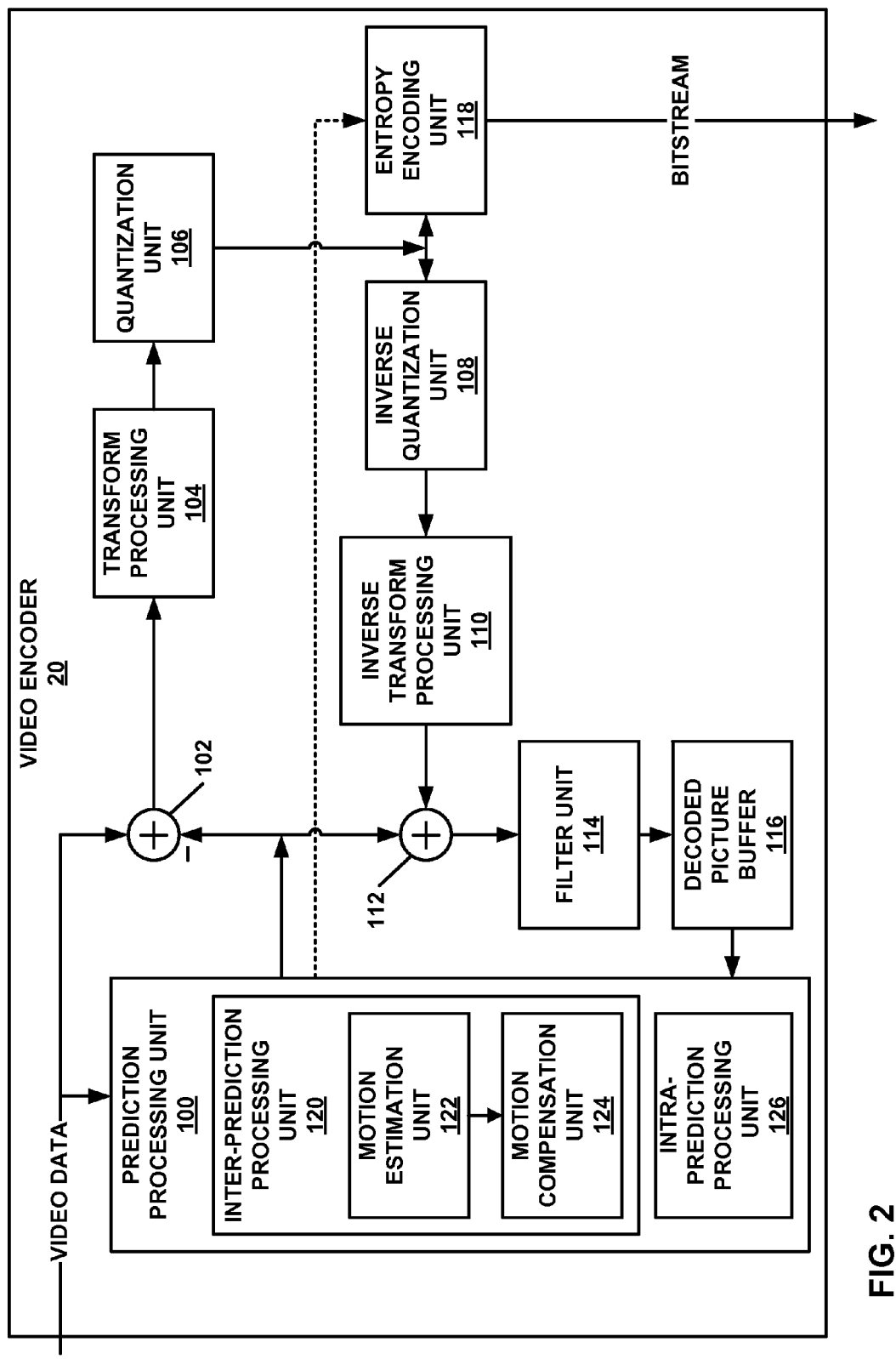
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

When inter-prediction processing unit 120 begins processing a P or a B slice, inter-prediction processing unit 120 may generate an initial version of a first reference picture list (i.e., RefPicList0). After generating the initial version of RefPicList0, inter-prediction processing unit 120 may perform an RPLM process to modify the order of reference pictures in RefPicList0. Inter-prediction processing unit 120 may generate RPLM commands that indicate how inter-prediction processing unit 120 modified RefPicList0. Furthermore, when inter-prediction processing unit 120 begins processing a B slice, inter-prediction processing unit 120 may further generate an initial version of a second reference picture list (i.e., RefPicList1). After generating the initial version of RefPicList1, inter-prediction processing unit 120 may perform an RPLM process to modify the order of reference pictures in RefPicList1. Inter-prediction processing unit 120 may generate RPLM commands that indicate how inter-prediction processing unit 120 modified RefPicList1.

Thus, in accordance with one or more example techniques of this disclosure, inter-prediction processing unit 120 may generate a bitstream that includes an ordered set of one or more RPLM syntax elements (e.g., RPLM commands). For each respective RPLM syntax element in the ordered set of RPLM syntax elements, when the respective RPLM syntax element is the last RPLM syntax element in the ordered set of RPLM syntax elements, the respective RPLM syntax element has a particular value. When the RPLM respective syntax element is not the last RPLM syntax element in the ordered set of RPLM syntax elements, the final reference picture list includes, at an insertion position for the respective RPLM syntax element, a particular reference picture. The respective RPLM syntax element indicates a position in the initial reference picture list of the particular reference picture. The insertion position for the respective RPLM syntax element corresponds to a position in the ordered set of RPLM syntax elements of the respective RPLM syntax element.

PUs in a P slice may be intra predicted or uni-directionally inter predicted. For instance, if a PU is in a P slice, motion estimation unit 122 may search the reference pictures in RefPicList0 for a reference region for the PU. The reference region for the PU may be a region, within a reference picture, that contains sample blocks that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

PUs in a B slice may be intra predicted, uni-directionally inter predicted, or bi-directionally inter predicted. Hence, if a PU is in a B slice, motion estimation unit 122 may perform uni-prediction or bi-prediction for the PU. To perform uni-prediction for the PU, motion estimation unit 122 may search the reference pictures of RefPicList0 or RefPicList1 for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a predictive block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may generate a predictive block of a PU based on samples from sample blocks of spatially-neighboring PUs. The spatially-neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding blocks of a CU and the selected predictive luma, Cb, and Cr blocks of the PUs of the CU, luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU.

Transform processing unit 104 may generate coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. The bitstream may also include syntax elements that are not entropy encoded.

Figure 3:
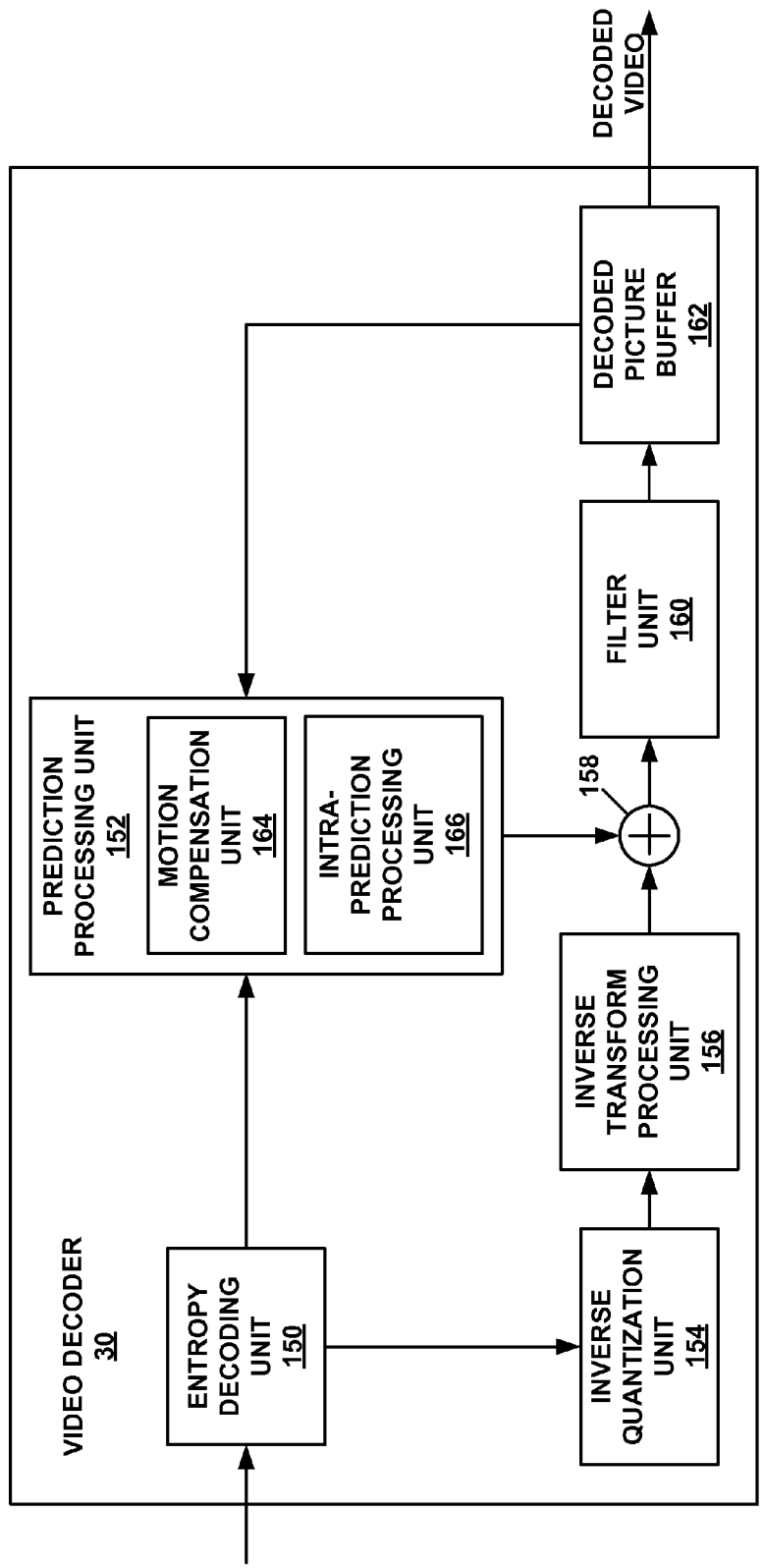
FIG. 3 is a block diagram illustrating an example video decoder that may implement the techniques described in this disclosure.

FIG. 3 is a block diagram illustrating an example video decoder 30 that may implement the techniques described in this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units of a bitstream and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform reconstruction operations on CUs. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples at the one or more reference regions for the PU, predictive luma, Cb, and Cr blocks for the PU.

Reconstruction unit 158 may use the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

As indicated above, when video decoder 30 begins decoding a slice of a current picture, prediction processing unit 152 may generate one or more reference picture lists (e.g., RefPicList0 and RefPicList1). To generate a reference picture list, prediction processing unit 152 may generate an initial version of the reference picture list. Prediction processing unit 152 may then modify the initial version of the reference picture list to generate a final version of the reference picture list (i.e., a final reference picture list). In other words, prediction processing unit 152 may perform an RPLM process on the initial version of the reference picture list in order to generate the final version of the reference picture list.

In accordance with a first example technique of this disclosure, prediction processing unit 152 may perform an initialization process described by the following pseudo-code to generate an initial version of RefPicList0 (i.e., RefPicListTemp0) when video decoder 30 decodes a slice header of a P or B slice.

```
rIdx = 0
while( rIdx < NumRpsCurrTempList0 ) {
    for( i = 0; i < NumPocStCurrBefore && rIdx <
    NumRpsCurrTempList0; rIdx++, i++ )
        RefPicListTemp0[ rIdx ] = RefPicSetStCurrBefore[ i ]
    for( i = 0; i < NumPocStCurrAfter && rIdx <
    NumRpsCurrTempList0; rIdx++, i++ )
        RefPicListTemp0[ rIdx ] = RefPicSetStCurrAfter[ i ]
    for( i = 0; i < NumPocLtCurr && rIdx <
    NumRpsCurrTempList0; rIdx++, i++ )
        RefPicListTemp0[ rIdx ] = RefPicSetLtCurr[ i ]
}
```

In the pseudo-code above, NumRpsCurrTempList0 may be equal to Max(num_ref_idx_l0_active_minus1+1, NumPocTotalCurr). As indicated above, the variable NumPocTotalCurr is equal to NumPocStCurrBefore+NumPocStCurrAfter+NumPocLtCurr. NumPocStCurrBefore indicates the number of elements in RefPicSetStBefore. NumPocStCurrAfter indicates the number of elements in RefPicSetStAfter. NumPocLtCurr indicates the number of elements in RefPicSetLtCurr.

Prediction processing unit 152 may perform a similar initialization process to generate an initial version of RefPicList1 (i.e., RefPicListTemp1) when video decoder 30 decodes a slice header of a B slice.

```
rIdx = 0
while( rIdx < NumRpsCurrTempList1 ) {
    for( i = 0; i < NumPocStCurrAfter && rIdx <
    NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
    NumRpsCurrTempList1; rIdx++, i++ )
        RefPicListTemp1[ rIdx ] = RefPicSetStCurrBefore[ i ]
    for( i = 0; i < NumPocLtCurr && rIdx <
    NumRpsCurrTempList1; rIdx++, i++ )
        RefPicListTemp1[ rIdx ] = RefPicSetLtCurr[ i ]
}
```

In the pseudo-code above, NumRpsCurrTempList1 may be equal to Max (num_ref_idx_l1_active_minus1+1, NumPocTotalCurr).

To modify the initial version of a reference picture list, prediction processing unit 152 may process an RPLM syntax structure obtained from the bitstream. The RPLM syntax structure may include an ordered set of one or more list_entry_lX syntax elements, where X is either 0 or 1. Table 2, below, is an example RPLM syntax structure in accordance with one or more techniques of this disclosure.

TABLE 2

| RPLM Syntax Structure | |
| --- | --- |
| ref_pic_list_modification( ) { | Descriptor |
|   if( slice_type == P \|\| slice_type == B ) { | |
|     ref_pic_list_modification_flag_l0 | u(1) |
|     if( ref_pic_list_modification_flag_l0 && NumPocTotalCurr > 1 ) | |
|       for( i = 0; i <= num_ref_idx_l0_active_minus1 && (!i \|\| list_entry_l0[ i−1 ] < NumPocTotalCurr); i++ ) | |
|         list_entry_l0[ i ] | u(v) |
|   } | |
|   if( slice_type == B ) { | |
|     ref_pic_list_modification_flag_l1 | u(1) |
|     if( ref_pic_list_modification_flag_l1 && NumPocTotalCurr > 1 ) | |
|       for( i = 0; i <= num_ref_idx_l1_active_minus1 && (!i \|\| list_entry_l1[ i−1 ] < NumPocTotalCurr); i++ ) | |
|         list_entry_l1[ i ] | u(v) |
|   } | |
| } | |

The italicized portions of Table 2 indicate portions of Table 2 that differ from Table 1, above. Furthermore, in the example of Table 2, a list_entry_lX[i] syntax element (i.e., a list_entry_l0[i] or a list_entry_l1[i] syntax element) specifies the index of a reference picture in RefPicSetCurrTempListX to be placed at a current position of RefPicListX (with X being 0 or 1). RefPicSetCurrTempListX denotes the initial version of RefPicListX. The current position of reference picture list LX is a position in RefPicListX equal to i. For instance, if i is equal to 1, the current position of RefPicListX is position 1.

In accordance with one or more techniques of this disclosure, the length of the list_entry_lX[i] syntax element is Ceil (Log 2(NumPocTotalCurr+1)) bits. Ceil( ) denotes the ceiling function. Log 2( )) denotes the log base 2 function. In contrast, in HEVC Working Draft 8, the length of the list_entry_lX[i] syntax element is Ceil (Log 2(NumPocTotalCurr)) bits.

Furthermore, in accordance with one or more techniques of this disclosure, the value of list_entry_lX[i] is in the range of 0 to NumPocTotalCurr, inclusive. In contrast, in HEVC Working Draft 8, the value of list_entry_lX[i] is in the range of 0 to NumPocTotalCurr−1, inclusive. If a list_entry_lX[i] syntax element is not present in the RPLM syntax structure, video decoder 30 may infer that the list_entry_lX[i] syntax element is equal to 0.

As indicated in Table 2 above, the RPLM syntax structure specifies a first "for" loop structure and a second "for" loop structure. The first "for" loop structure controls the generation of list_entry_l0[i] syntax elements. The second "for" loop structure controls the generation of list_entry_l1[i] syntax elements. The loop constraint for the first "for" loop allows a counter i to continue incrementing (and additional list_entry_l0[i] syntax elements to be generated) so long as the counter i is less than or equal to the number of active reference pictures in RefPicList0 (i.e., num_ref_idx_l0_active_minus1) and, if the counter i is not equal to 0 or the previous list_entry_l0 syntax element (i.e., list_entry_l0[i−1]) is less than NumPocTotalCurr. Thus, if the previous list_entry_l0 syntax element is equal to NumPocTotalCurr, there are no additional list_entry_l0 syntax elements in the RPLM syntax structure. The loop constraint for the second "for" loop is similar. Thus, when list_entry_lX[i] is equal to NumPocTotalCurr, the reference picture list reordering syntax for RefPicListX ends.

NumPocTotalCurr may be less than num_ref_idx_l0_active_minus1 and/or num_ref_idx_l1_active_minus1. Accordingly, the RPLM syntax structure may include fewer list_entry_l0[i] syntax elements than entries in RefPicList0. Likewise, the RPLM syntax structure may include fewer list_entry_l1[i] syntax elements than entries in RefPicList1. Thus, an ordered set of RPLM syntax elements may include fewer RPLM syntax elements than a total number of reference pictures in a final version of a reference picture list (e.g., RefPicList0 or RefPicList1).

In one alternative example, prediction processing unit 152 may set a temporary reference picture index list RefPicIdxTempList as follows: RefPicIdxTempList[j]=j % NumPocTotalCurr. In another alternative example, RefPicIdxTempList is set such that RefPicIdxTempList[j]=j for each j from 0 to num_ref_idx_lX_active_minus1, inclusive. In another alternative, RefPicIdxTempList is replaced by RefPicListTempX, which X being equal to either 0 or 1. In still another alternative, RefPicIdxTempList is set as follows: RefPicIdxTempList[j]=j % NumPocTotalCurr.

In Table 2, the ref_pic_list_modification_flag_l0 syntax element and the ref_pic_list_modification_flag_l1 syntax element may have the same semantics as described above. In this disclosure, ref_pic_list_modification_flag_lX denotes ref_pic_list_modification_flag_l0 or ref_pic_list_modification_flag_l1, depending on whether X is equal to 0 or 1. When ref_pic_list_modification_flag_lX is equal to 1, prediction processing unit 152 may perform a modification process for RefPicListX. The following pseudo-code describes an example modification process for RefPicListX.

```
i=0;
While list_entry_lX[ i ] is smaller than NumPocTotalCurr,
the following steps apply:
    ExistPos= num_ref_idx_lx_active_minus1;
    for (j = i; j <= num_ref_idx_lX_active_minus1 && ExistPos= =
    num_ref_idx_lX_active_minus1; j++)
        if ( RefPicIdxTempList [j] == list_entry_lX[i] ) ExistPos=j
        // To find the first position of the existing index in the
        // RefPicIdxTempList
    if (ExistPos>i){
        for( cIdx = ExistPos; cIdx > i; cIdx- - )
            RefPicIdxTempList[ cIdx ] =
            RefPicIdxTempList[ cIdx - 1 ]
        RefPicIdxTempList[ i ] = list_entry_lX[ i ]
    }
    // To shift the entries in the list from i to ExistPos
    i++;
for( rIdx = 0; rIdx <= num_ref_idx_lX_active_minus1; rIdx++)
    RefPicListX[ rIdx ]= RefPicListTempX[ RefPicIdxTempList[ rIdx ] ]
```

As indicated above, video decoder 30 may generate a temporary reference picture index list (i.e., RefPicIdxTempList). In the pseudo-code above, video decoder 30 may check each respective RPLM syntax element that is less than NumPocTotalCurr. When video decoder 30 checks the respective syntax element, video decoder 30 may determine a value ExistPos. ExistPos indicates a position in RefPicIdxTempList that contains an index value equal to the index value specified by the RPLM syntax element. Furthermore, video decoder 30 may shift, by one position, a set of index values in RefPicIdxTempList. The set of index values starts with an index value at a position within RefPicIdxTempList identified by an index (i.e., i) to a position of the RPLM syntax element in the ordered set of RPLM syntax elements. The set of index values ends with the index value at the position in RefPicIdxTempList indicated by ExistPos. Video decoder 30 may then insert, into the RefPicIdxTemplist, the index value specified by the RPLM syntax element (i.e., RefPicIdxTempList[i]=list_entry_lX[i]).

Furthermore, according to the pseudo-code above, video decoder 30 may generate the final version of the reference picture list by setting a position indicator (i.e., rIdx) to 0 and performing a loop while the position indicator is less than or equal to the number of active reference pictures in reference picture list X minus 1 (i.e., num_ref_idx_lX_active_minus1). During each cycle of the loop, video decoder 30 may configure the final version of the reference picture list such that a current position in the final version of the reference picture list is a reference picture at a current position in the initial version of the reference picture list. The position indicator indicates the current position in the final version of the reference picture list and indicates a current position in the temporary reference picture index list (i.e., RefPicIdxTempList). The index value at the current position in RefPicIdxTempList indicates the current position in the initial version of the reference picture list.

In this way, video decoder 30 may generate a temporary reference picture index list (i.e., RefPicIdxTempList). Furthermore, for each respective RPLM syntax element in the ordered set of RPLM syntax elements that is less than a particular value (e.g., NumPocTotalCurr), video decoder 30 may determine an end position (i.e., ExistPos) associated with the respective RPLM syntax element. The end position associated with the respective RPLM syntax element is a position in the temporary reference picture index list that contains an index value equal to an index value specified by the respective RPLM syntax element. Furthermore, video decoder 30 may shift, by one position, a set of index values in the temporary reference picture index list. The set of index values starts with an index value at a position within the temporary reference picture index list identified by an index to a position of the respective RPLM syntax element in the ordered set of RPLM syntax elements. The set of index values ends with the end position associated with the respective RPLM syntax element.

For example, video decoder 30 may, for each integer value of a position indicator from 0 to a value 1 less than the number of active reference pictures in the reference picture list, when a current RPLM syntax element is not equal to the particular value, assign a reference picture at a current position in the initial version of the reference picture list equal to a current position in the final version of the reference picture list. The position indicator indicates the current position in the final version of the reference picture list and a position of the current RPLM syntax element in the ordered set of RPLM syntax elements. The current RPLM syntax element indicates the current position in the initial version of the reference picture list. In a more specific example, video decoder 30 may set the position indicator to 0. In this example, while a position indicator is less than the number of positions in the final version of the reference picture list, video decoder 30 may configure the final version of the reference picture list such that a reference picture at a current position in the initial version of the reference picture list is assigned to a current position in the final version of the reference picture list. As before, the position indicator indicates the current position in the final version of the reference picture list and a position in the temporary reference picture index list of a current index value of the temporary reference picture index list. The current index value of the temporary reference picture index list indicates the current position in the initial version of the reference picture list. Furthermore, while the position indicator is less than the number of positions in the final version of the reference picture list, video decoder 30 may increment the position indicator.

In one alternative, the following pseudo-code describes the modification process for RefPicListX.

```
i=0;
While list_entry_lX[ i ] is smaller than NumPocTotalCurr,
the following steps apply.
        ExistPos= num_ref_idx_lx_active_minus1;
        if (IdxLXTemp<= num_ref_idx_lx_active_minus1)
        for ( j = i; j <= num_ref_idx_lx_active_minus1 && ExistPos= =
num_ref_idx_lx_active_minus1; j++)
          if (RefPicIdxTempList [j]== list_entry_lX[ i ]) ExistPos=j
        // To find the position of the existing index in the RefPicIdxTempList
        if (ExistPos>i){
          for( cIdx = ExistPos; cIdx >i; cIdx--)
            RefPicIdxTempList[cIdx] = RefPicIdxTempList[cIdx-1]
          RefPicIdxTempList[i] = list_entry_lX[ i ]
        }
        // To shift the entries in the list from i to ExistPos
        i++;
Reset the RefPicListX as follows:
        for( rIdx = 0; rIdx <= num_ref_idx_lX_active_minus1;
        rIdx++)
            RefPicListX[ rIdx ]=
            RefPicListTempX[RefPicIdxTempList[rIdx]]
(with X being either 0 or 1)
```

In some example techniques of this disclosure, prediction processing unit 152 may generate a final version of RefPicList0 according to the following pseudo-code:

```
for( rIdx = 0; rIdx ≤ num_ref_idx_l0_active_minus1; rIdx++)
    RefPicList0[ rIdx ] = RefPicListTemp0[ rIdx ]
```

In the pseudo-code above, num_ref_idx_l0_active_minus1 is the number of active reference pictures in RefPicList0 and RefPicListTemp0 is the initial version of RefPicList0. In contrast, in HEVC Working Draft 8, the final version of RefPicList0 may be generated according to the following pseudo-code:

```
for( rIdx = 0; rIdx ≤ num_ref_idx_l0_active_minus1; rIdx++)
    RefPicList0[ rIdx ] = ref_pic_list_modification_flag_l0 ?
        RefPicListTemp0[ list_entry_l0[ rIdx ] ] :
        RefPicListTemp0[ rIdx ]
```

In the pseudo-code above, num_ref_idx_l0_active_minus1 is the number of active reference pictures in RefPicList0, RefPicListTemp0 is the initial version of RefPicList0, and ref_pic_list_modification_flag_l0 indicates whether RPLM commands are specified for RefPicListTemp0.

Similarly, in some example techniques of this disclosure, prediction processing unit 152 may generate a final version of RefPicList1 according to the following pseudo-code:

```
for( rIdx = 0; rIdx ≤ num_ref_idx_l1_active_minus1; rIdx++)
    RefPicList1[ rIdx ] = RefPicListTemp1[ rIdx ]
```

In contrast, in HEVC Working Draft 8, the final version of RefPicList1 may be generated according to the following pseudo-code:

```
for( rIdx = 0; rIdx ≤ num_ref_idx_l1_active_minus1; rIdx++)
    RefPicList1[ rIdx ] = ref_pic_list_modification_flag_l1 ?
        RefPicListTemp1[ list_entry_l1[ rIdx ] ] :
        RefPicListTemp1[ rIdx ]
```

Table 3, below, shows an alternative version of Table 2.

TABLE 3

| ref_pic_list_modification( ) { | Descriptor |
|---|---|
| if( slice_type == P \|\| slice type == B ) { | |
|   ref_pic_list_modification_flag_l0 | u(1) |
|   if( ref_pic_list_modification_flag_l0 && NumPocTotalCurr > 1 ) | |
|     for( i = 0; i <= num_ref_idx_l0_active_minus1 && list_entry_l0[ i-1 ] < NumPocTotalCurr, i++ ) | |
|       list_entry_l0[ i ] | u(v) |
| } | |
| if( slice_type == B ) { | |
|   ref_pic_list_modification_flag_l1 | u(1) |
|   if( ref_pic_list_modification_flag_l1 && NumPocTotalCurr > 1 ) | |
|     for( i = 0; i <= num_ref_idx_l1_active_minus1 && list_entry_l1 [i-1] < NumPocTotalCurr, i++ ) | |
|       list_entry_l1[ i ] | u(v) |
| } | |
| } | |

In a second example technique of this disclosure, prediction processing unit 152 may initialize a temporary reference picture list RefPicIdxTempList. For each j from 0 through num_ref_idx_lX_active_minus1, RefPicIdxTempList is set such that RefPicIdxTempList[j]=j % NumPocTotalCurr, where % is the modulo operator. Furthermore, prediction processing unit 152 may perform an RPLM process indicated by the following pseudo-code when ref_pic_list_modification_flag_lX is equal to 1:

```
i = 0;
While list_entry_lX[ i ] is smaller than NumPocTotalCurr,
the following steps apply:
        ExistPos= num_ref_idx_lx_active_minus1;
        for ( j = i; j <= num_ref_idx_lX_active_minus1 && ExistPos= =
num_ref_idx_lX_active_minus1; j++)
            if ( RefPicIdxTempList [j] == list_entry_lX[i]) ExistPos=j
        // To find the first position of the existing index in the
        // RefPicIdxTempList
        if (ExistPos > i) {
            for( cIdx = ExistPos; cIdx > i; cIdx- - )
                RefPicIdxTempList[ cIdx ] =
                RefPicIdxTempList[ cIdx - 1 ]
            RefPicIdxTempList[ i ] = list_entry_lX[ i ]
        }
        // To shift the entries in the list from i to ExistPos
        i++;
```

Furthermore, in the second example technique of this disclosure, prediction processing unit 152 may reset RefPicListX as follows, regardless of ref_pic_list_modification_flag_lX.

```
for( rIdx = 0; rIdx <= num_ref_idx_lX_active_minus1; rIdx++)
    RefPicListX[ rIdx ]= RefPicListTempX[ RefPicIdxTempList[ rIdx ] ]
```

In this way, for each respective RPLM syntax element in the ordered set of RPLM syntax elements that is smaller than the particular value, video decoder 30 may modify the initial version of the reference picture list such that for each respective reference picture in a range of positions in the initial version of the reference picture list starting at the insertion position for the respective RPLM syntax element and ending at a position in the initial version of the reference picture list indicated by the respective RPLM syntax element, the respective reference picture is shifted by one position in the initial version of the reference picture list. Furthermore, video decoder 30 may generate the final version of the reference picture list by setting an index value (i.e., rIdx) to 0. While the index value is less than the number of active reference pictures in the reference picture list (i.e., num_ref_idx_lX_active_minus1), video decoder 30 may set a current position in the final version of the reference picture list equal to a current position in the initial version of the reference picture list and video decoder 30 may increment the index value. The index value indicates the current position in the final version of the reference picture list and a current RPLM syntax element in the ordered set of RPLM syntax elements. Furthermore, the current RPLM syntax element indicates the current position in the initial version of the reference picture list.

In an alternate version, prediction processing unit 152 may perform an RPLM process indicated by the following pseudo-code when ref_pic_list_modification_flag_lX is equal to 1:

```
i=0;
While list_entry_lX[ i ] is smaller than NumPocTotalCurr,
the following steps apply.
    ExistPos= num_ref_idx_lx_active_minus1;
    if (IdxLXTemp<= num_ref_idx_lx_active_minus1)
    for ( j = i; j <= num_ref_idx_lx_active_minus1 && ExistPos= =
num_ref_idx_lx_active_minus1; j++)
        if (RefPicIdxTempList [j]== list_entry_lX[ i ]) ExistPos=j
        // To find the position of the existing index in the RefPicIdxTempList
        if (ExistPos>i){
        for( cIdx = ExistPos; cIdx >i; cIdx--)
            RefPicIdxTempList[cIdx] = RefPicIdxTempList[cIdx-1]
        RefPicIdxTempList[i] = list_entry_lX[ i ]
        }
        // To shift the entries in the list from i to ExistPos
        i++;
```

In the second example technique of this disclosure, the following clauses can be removed from the reference picture list initialization part of HEVC Working Draft 8:

The list RefPicList0 is constructed as follows:

```
for( rIdx = 0; rIdx ≤ num_ref_idx_l0_active_minus1; rIdx++)
    RefPicList0[ rIdx ] = ref_pic_list_modification_flag_l0 ?
    RefPicListTemp0[
    list_entry_l0[ rIdx ] ] : RefPicListTemp0[ rIdx ]
```

When the slice is a B slice, the list RefPicList1 is constructed as follows:

```
for( rIdx = 0; rIdx ≤ num_ref_idx_l1_active_minus1; rIdx++)
    RefPicList1[ rIdx ] = ref_pic_list_modification_flag_l1 ?
    RefPicListTemp1[
    list_entry_l1[ rIdx ] ] : RefPicListTemp1[ rIdx ]
```

A third example technique of this disclosure is similar to the first and second example techniques of this disclosure described above. However, in the third example technique, the changes to HEVC Working Draft 8 apply only to a multi-view coding extension (or other extension) and not a base HEVC specification. Alternatively, the changes to HEVC Working Draft 8 may apply only to a multi-view coding extension when inter-view prediction is enabled. In this third example technique, it may be possible for the HEVC multi-view coding and/or 3-dimensional video (3DV) coding extensions of HEVC to use the techniques of this disclosure without changes to the HEVC base specification.

A fourth example technique of this disclosure uses the same syntax and semantics as those described with regard to the first example technique described above. However, in the fourth example technique, the semantics of the list_entry_lX[i] syntax element are changed such that the process of reference picture list initialization incorporates RPLM. Like the other techniques of this disclosure, the fourth example technique supports the signaling of the end of reference picture list modification. In accordance with the fourth example technique of this disclosure, when list_entry_lX[i] is not present in an RPLM syntax structure, prediction processing unit 152 may derive list_entry_lX[i] to be equal to (i==0) ? 0: (list_entry_lX[i−1]+1) % NumPocTotalCurr. That is, when list_entry_lX[i] is not present in an RPLM syntax structure, prediction processing unit 152 may determine that list_entry_lX[i] is equal to 0 if i is equal to 0 and may determine that list_entry_lX[i] is equal to a previous list_entry_lX syntax element plus 1 mod NumPocTotalCurr.

In this way, when the bitstream does not include data that indicate a particular RPLM syntax element in the ordered set of RPLM syntax elements, if the particular RPLM syntax element is the first RPLM syntax element in the ordered set of RPLM syntax elements, video decoder 30 may determine that a value of the particular RPLM syntax element is equal to 0. If the particular RPLM syntax element is not the first RPLM syntax element in the ordered set of RPLM syntax elements, video decoder 30 may determine that the value of the particular RPLM syntax element is equal to a value of a previous RPLM syntax element in the ordered set of RPLM syntax elements plus 1, modulo a total number of current POC values in the initial version of the reference picture list (i.e., NumPocTotalCurr).

In an alternative version of the fourth example technique of this disclosure, when list_entry_lX[i] is not present in an RPLM syntax structure, prediction processing unit 152 may determine that list_entry_lX[i] is equal to 1% NumPocTotalCurr. Thus, in this alternative version of the fourth example technique of this disclosure, when the bitstream does not include data that indicate an RPLM syntax element in the ordered set of RPLM syntax elements, video decoder 30 may determine that a value of the particular RPLM syntax element is equal to an index i of the position in the ordered set of RPLM syntax elements of the particular RPLM syntax element modulo a total number of current picture order count values in the initial version of the reference picture list (i.e., NumPocTotalCurr).

In the fourth example technique of this disclosure, the reference picture list initialization process and reference picture list modification process of HEVC Working Draft 8 may still apply after prediction processing unit 152 determines the values of list_entry_lX[i] as described with regard to the fourth example technique of this disclosure.

A fifth example technique of this disclosure is similar to the first example technique of this disclosure. However, in the fifth example technique of this disclosure, prediction processing unit 152 may perform the reference picture list modification process such that list entries are modified by replacing the entry in a target position identified by list_entry_lX[i], but other entries in the reference picture list do not change. In other words, an RPLM command replaces one reference picture in the reference picture list with another reference picture list, without shifting reference pictures in the reference picture list.

In this fifth example technique, the syntax table for ref_pic_list_modification( ) may be the same as shown in Table 2, above. However, in the fifth example technique, when ref_pic_list_modification_flag_lX is equal to 1, prediction processing unit 152 may generate RefPicListX as follows:

```
for( rIdx = 0; rIdx <= num_ref_idx_lX_active_minus1 &&
     list_entry_lX[ i ] != NumPocTotalCurr; rIdx++)
    RefPicListX[ rIdx ] =
        RefPicListTempX[ list_entry_lX[ rIdx ] ]
```

Thus, in this fifth example technique, video decoder 30 may set a position indicator (i.e., rIdx) to 0. Furthermore, while a position indicator (i.e., rIdx) is less than the number of positions in the final version of the reference picture list (i.e., num_ref_idx_lX_active_minus1) and a value of a current RPLM syntax element (i.e., list_entry_lX[i]) in the ordered set of one or more RPLM syntax elements is not equal to the particular value (i.e., NumPocTotalCurr), video decoder 30 may assign a reference picture at a current position in the initial version of the reference picture list (i.e., RefPicListTempX) to a current position in the final version of the reference picture list (i.e., RefPicListX[rIdx]). The position indicator indicates the current position in the final version of the reference picture list (i.e., RefPicListX[rIdx]) and a position of the current RPLM syntax element (i.e., list_entry_lX [rIdx]) in the ordered set of RPLM syntax elements. The current RPLM syntax element (i.e., list_entry_lX[rIdx]) indicates the current position in the initial version of the reference picture list (i.e., RefPicListTempX[list_entry_lX[rIdx]). Furthermore, while a position indicator is less than the number of positions in the final version of the reference picture list and a value of a current RPLM syntax element in the ordered set of one or more RPLM syntax elements is not equal to the particular value, video decoder 30 may increment the position indicator (i.e., rIdx).

Furthermore, in accordance with some example techniques of this disclosure, the reference picture list initialization process may be simplified as follows. These simplifications to the reference picture list initialization process may be applicable to the fourth and fifth techniques described above, as well as to HEVC Working Draft 8. In particular, prediction processing unit 152 may invoke an initialization process for reference picture lists once with X=0 when decoding a P or B slice header and once with X=1 when decoding a B slice header. Prediction processing unit 152 may construct an initial version of RefPicList0 (RefPicListTemp0) and an initial version of RefPicList1 (RefPicListTemp1) as follows:

```
rIdx = 0
for( i = 0; i < NumPocStCurrBefore; rIdx++, i++ )
    RefPicListTemp0[ rIdx ] = RefPicSetStCurrBefore[ i ]
for( i = 0; i < NumPocStCurrAfter; rIdx++, i++ )
    RefPicListTemp0[ rIdx ] = RefPicSetStCurrAfter[ i ]
for( i = 0; i < NumPocLtCurr; rIdx++, i++ )
    RefPicListTemp0[ rIdx ] = RefPicSetLtCurr[ i ]
rIdx = 0
for( i = 0; i < NumPocStCurrBefore; rIdx++, i++ )
    RefPicListTemp1[ rIdx ] = RefPicSetStCurrAfter[ i ]
for( i = 0; i < NumPocStCurrAfter; rIdx++, i++ )
    RefPicListTemp1[ rIdx ] = RefPicSetStCurrBefore[ i ]
for( i = 0; i < NumPocLtCurr; rIdx++, i++ )
    RefPicListTemp1[ rIdx ] = RefPicSetLtCurr[ i ]
```

Prediction processing unit 152 may construct a final version of RefPicListX (i.e., RefPicListTemp0 or RefPicListTemp1) as follows:

```
for( rIdx = 0; rIdx <= num_ref_idx_lX_active_minus1; rIdx++)
    RefPicListX[ rIdx ] = RefPicListTempX[ list_entry_lX[ rIdx ]
        % NumPocTotalCurr ]
```

Figure 4:
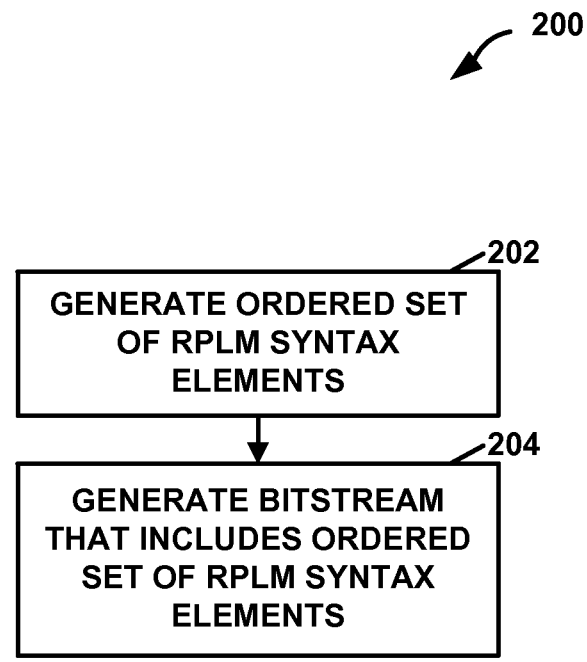
FIG. 4 is a flowchart illustrating an example operation of a video encoder, in accordance with one or more techniques of this disclosure.

FIG. 4 is a flowchart illustrating an example operation 200 of video encoder 20, in accordance with one or more techniques of this disclosure. In the example of FIG. 4, video encoder 20 generates an ordered set of one or more RPLM syntax elements (202). For each respective RPLM syntax element in the ordered set of RPLM syntax elements, when the respective RPLM syntax element is the last RPLM syntax element in the ordered set of RPLM syntax elements, the respective RPLM syntax element has a particular value. When the respective RPLM syntax element does not have the particular value, the respective RPLM syntax element indicates that a final version of a reference picture list includes, at an insertion position for the respective RPLM syntax element, a particular reference picture. The respective RPLM syntax element indicates a position, within an initial version of the reference picture list, of the particular reference picture. The insertion position for the respective RPLM syntax element corresponds to a position in the ordered set of RPLM syntax elements of the respective RPLM syntax element. Furthermore, video encoder 20 generates a bitstream that includes the ordered set of one or more RPLM syntax elements (204).

Figure 5:
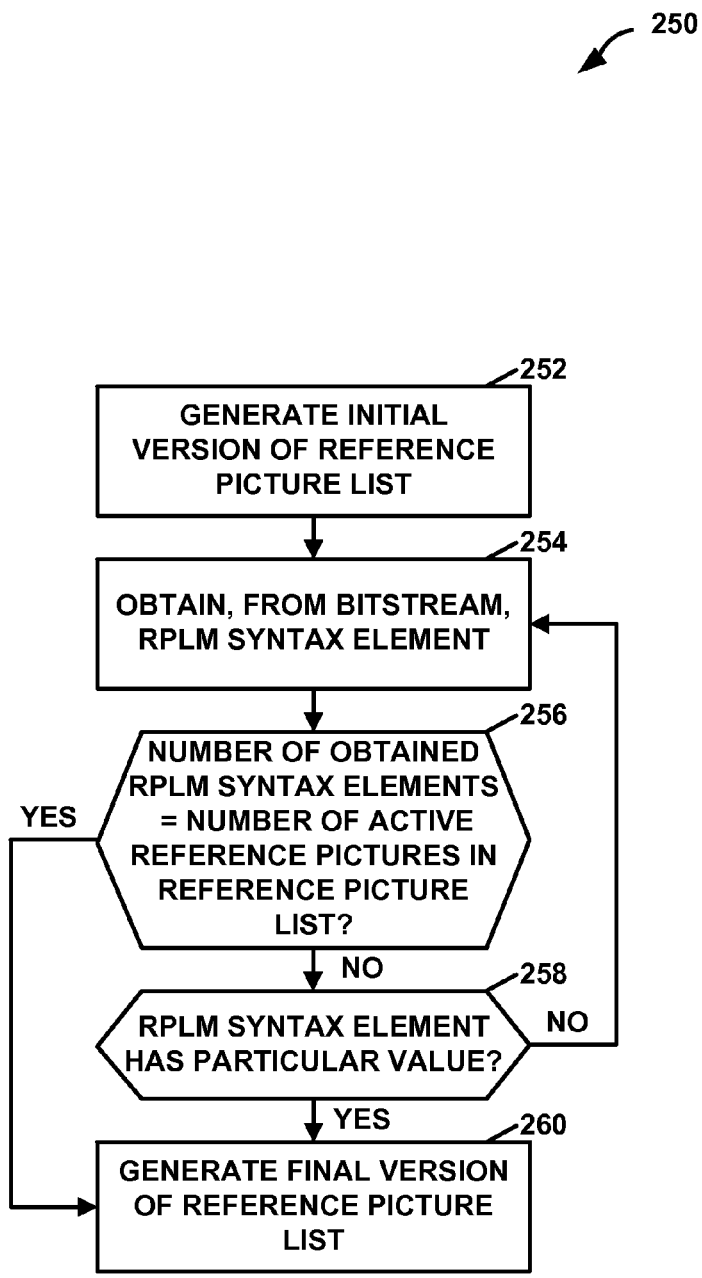
FIG. 5 is a flowchart illustrating an example operation of a video decoder, in accordance with one or more techniques of this disclosure.

FIG. 5 is a flowchart illustrating an example operation 250 of video decoder 30, in accordance with one or more techniques of this disclosure. In the example of FIG. 5, video decoder 30 generates an initial version of a reference picture list (252). In addition, video decoder 30 may obtain, from a bitstream, an RPLM syntax element (254). Video decoder 30 may then determine whether the number of obtained RPLM syntax elements is equal to the number of active reference pictures in the reference picture list (256). In response to determining that the number of obtained RPLM syntax elements is not equal to the number of active reference pictures in the reference picture list ("NO" of 256), video decoder 30 may determine whether the RPLM syntax element has a particular value (258). In some examples, the particular value is equal the number of reference pictures in RefPicSetStCurrBefore, RefPicSetStCurrAfter, and RefPicSetLtCurr. In response to determining that the RPLM syntax element does not have the particular value ("NO" of 258), video decoder 30 may obtain, from the bitstream, another RPLM syntax element (254). Thus, when the value of the RPLM syntax element does not have the particular value, video decoder 30 may obtain, from the bitstream, a next RPLM syntax element in the ordered set of RPLM syntax elements. In this way, video decoder 30 may obtain the ordered set of RPLM syntax elements. Furthermore, as part of obtaining the ordered set of RPLM syntax elements, video decoder 30 may determine that the ordered set of RPLM syntax elements does not include any additional RPLM syntax elements when an RPLM syntax element in the ordered set of RPLM syntax elements has a particular value.

When the number of obtained RPLM syntax elements equals the number of active reference pictures in the initial reference picture list ("YES" of 256) or the RPLM syntax element has the particular value ("YES" of 258), video decoder 30 may generate a final version of the reference picture list (260). Thus, video decoder 30 may determine that the RPLM syntax element is the last RPLM syntax element in the ordered set of RPLM syntax elements when the RPLM syntax element has the particular value. Furthermore, for each respective RPLM syntax element in the ordered set of RPLM syntax elements that does not have the particular value, the final version of the reference picture list includes, at an insertion position for the respective RPLM syntax element, a reference picture associated with the respective RPLM syntax element. Furthermore, the respective RPLM syntax element indicates a position in the initial version of the reference picture list of the reference picture associated with the respective RPLM syntax element. The insertion position for the respective RPLM syntax element corresponds to a position in the ordered set of RPLM syntax elements of the respective RPLM syntax element.

Figure 6:
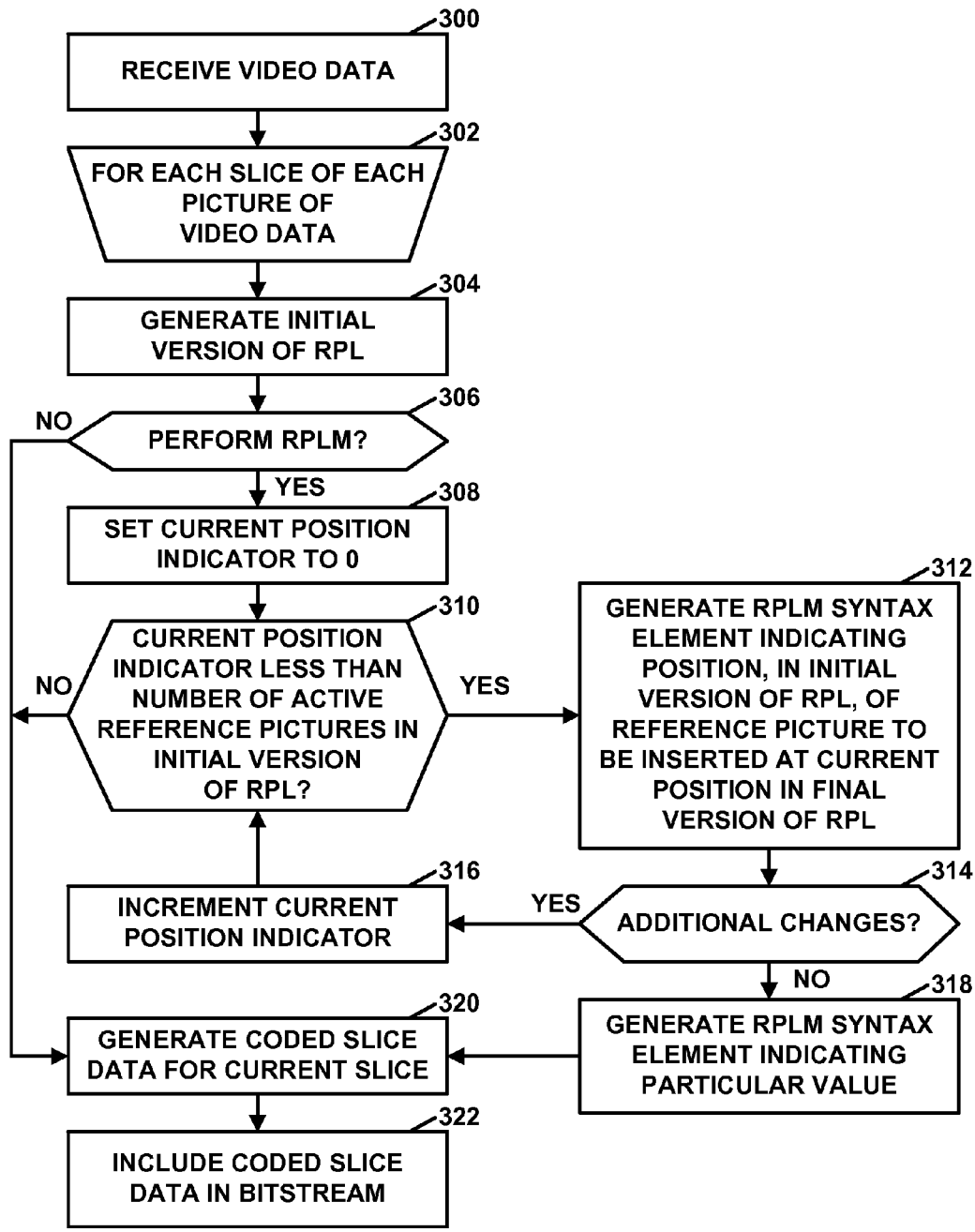
FIG. 6 is a flowchart illustrating an example operation of the video encoder.

FIG. 6 is a flowchart illustrating an example operation of video encoder 20. The example operation of FIG. 6 may be a more specific example of operation 200 of FIG. 4. In the example of FIG. 6, video encoder 20 may receive video data (300). Furthermore, video encoder 20 may perform the following actions for each slice of each picture of the video data (302).

In the example of FIG. 6, video encoder 20 may generate an initial version of a reference picture list (RPL) (304). Video encoder 20 may then determine whether to perform an RPLM operation on the RPL (306). In response to making the determination to perform the RPLM operation on the RPL ("YES" of 306), video encoder 20 may set a current position indicator to 0 (308). Video encoder 20 may then determine whether the current position indicator is less than the number of active reference pictures in the initial version of the RPL (310). In response to determining that the current position indicator is less than the number of active reference pictures in the initial version of the RPL ("YES" of 310), video encoder 20 may generate an RPLM syntax element indicating a position, in the initial version of the RPL, of a reference picture to be inserted at a current position in a final version of the RPL (312). The current position indicator may indicate the current position in the final version of the RPL.

Furthermore, video encoder 20 may determine whether there are any additional changes to be made to the RPL (314). In response to determining that there are additional changes to be made to the RPL ("YES" of 314), video encoder 20 may increment the current position indicator (316) and determine again whether the current position indicator is less than the number of active reference pictures in the initial version of the RPL (310). On the other hand, in response to determining that there are no additional changes to be made to the RPL ("NO" of 314), video encoder 20 may generate an RPLM syntax element indicating a particular value (318).

After generating the RPLM syntax element indicating the particular value, in response to making the determination not to perform RPLM ("NO" of 306), or in response to determining that the current position indicator is not less than the number of active reference pictures in the initial version of the RPL ("NO" of 310), video encoder 20 may generate coded data for the current slice (320). Video encoder 20 may include the coded data for the current slice in a bitstream (322).

Figure 7:
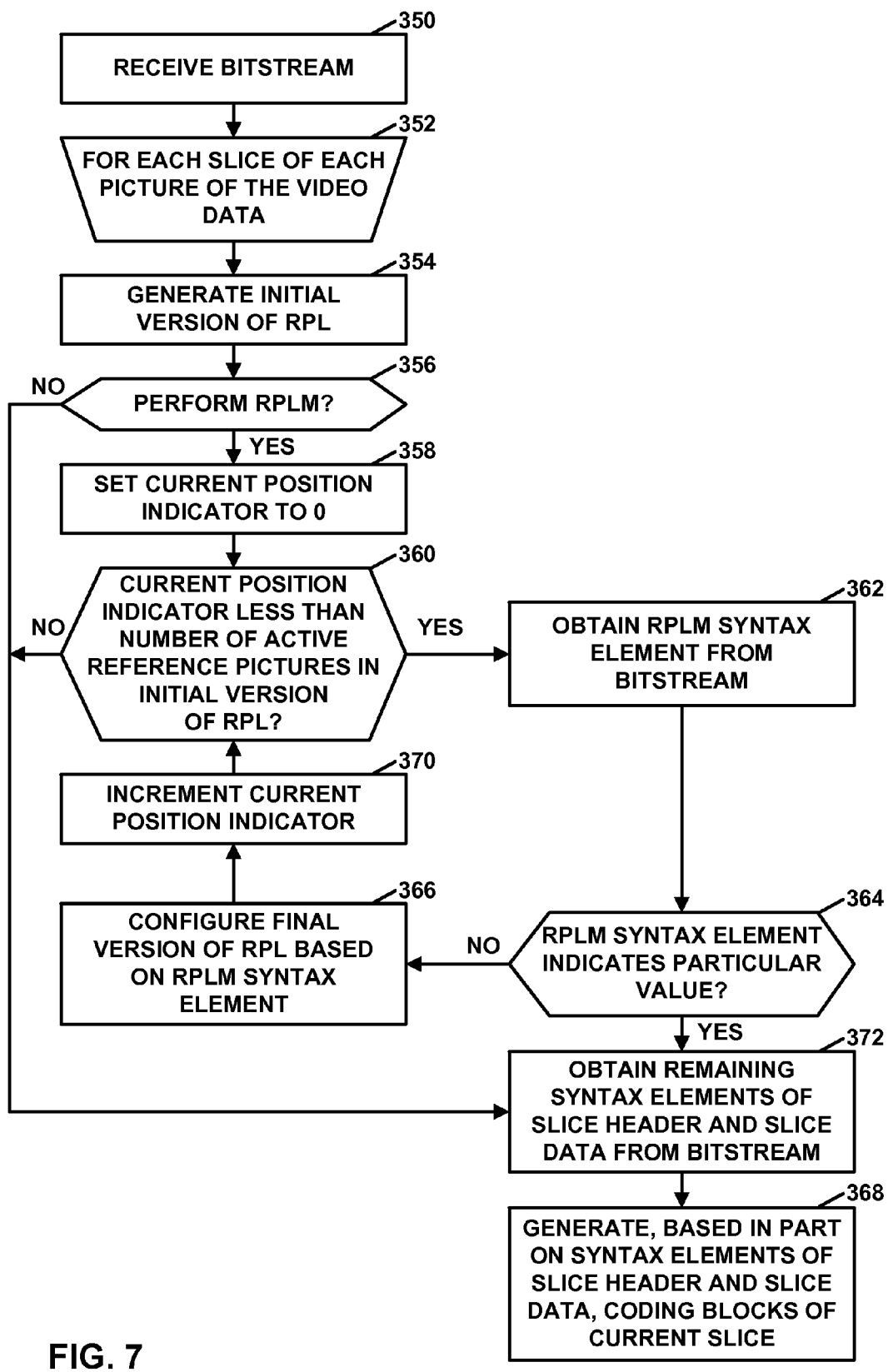
FIG. 7 is a flowchart illustrating an example operation of the video decoder.

FIG. 7 is a flowchart illustrating an example operation of video decoder 30. The example operation of video decoder 30 may be a more specific example of operation 250 of FIG. 5. In the example of FIG. 7, video decoder 30 may receive a bitstream that includes a coded representation of video data (350). Video decoder 30 may perform the following actions for each slice of each picture of the video data (352).

In the example of FIG. 7, video decoder 30 may generate an initial version of a RPL for the current slice (354). In addition, video decoder 30 may determine whether to perform RPLM on the RPL (356). In response to making the determination to perform RPLM on the RPL ("YES" of 356), video decoder 30 may set a current position indicator to 0 (358). Furthermore, video decoder 30 may determine whether the current position indicator is less than the number of active reference pictures in the initial version of the RPL (360). In response to determining that the current position indicator is less than the number of active reference pictures in the initial version of the RPL ("YES" of 360), video decoder 30 may obtain an RPLM syntax element from the bitstream (362). Video decoder 30 may then determine whether the RPLM syntax element indicates a particular value (364).

In response to determining that the current RPLM syntax element does not have the particular value ("NO" of 364), video decoder 30 may configure a final version of the RPL based on the RPLM syntax element (366). For instance, video decoder 30 include at a position, in the final version of the RPL, indicated by the current position indicator, a reference picture at a position, in the initial version of the RPL, indicated by the RPLM syntax element. Video decoder 30 may then increment the current position indicator (370) and determine again whether the current position indicator is less than the number of active reference picture in the initial version of the RPL (360).

On the other hand, in response to determining that the current RPLM syntax element indicates the particular value, or in response to making the determination not to apply RPLM to the RPL ("NO" of 356), or in response to determining that the current position indicator is not less than the number of reference pictures in the initial version of the RPL ("NO" of 360), video decoder 30 may obtain, from the bitstream, remaining syntax element of a slice header and slice data of the current slice (372). In addition, video decoder 30 may generate, based in part on the syntax elements of the slice header and slice data of the current slice, coding blocks of the current slice (368).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    generating an initial version of a reference picture list;
    determining that a reference picture list modification (RPLM) syntax element is a last RPLM syntax element in an ordered set of one or more RPLM syntax elements when the RPLM syntax element has a particular value;
    generating a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element, wherein the respective RPLM syntax element indicates
        a position in the initial version of the reference picture list of the reference picture associated with the respective RPLM syntax element, and
        wherein the insertion position for the respective RPLM syntax element corresponds to a position in the ordered set of RPLM syntax elements of the respective RPLM syntax element; and
    decoding, based on a reference picture in the reference picture list, a block of the video data.

2. The method of claim 1, wherein:
    the method further comprises determining a first reference picture set (RPS) subset, a second RPS subset, and a third RPS subset, wherein the first RPS subset includes short-term reference pictures that occur before a current picture in output order and are used for reference by the current picture, the second RPS subset includes short-term reference pictures that occur after the current picture in output order and are used for reference by the current picture, the third RPS subset includes long-term reference pictures used for reference by the current picture;
    generating the initial version of the reference picture list comprises generating, based on the first, second, and third RPS subsets, the initial version of the reference picture list; and
    the particular value is equal to a total number of reference pictures in a set of reference pictures that includes the first, second, and third RPS subsets.

3. The method of claim 1, wherein generating the final version of the reference picture list comprises:
    generating a temporary reference picture index list;
    for each respective RPLM syntax element in the ordered set of RPLM syntax elements that is less than the particular value:
        determining an end position associated with the respective RPLM syntax element, wherein the end position associated with the respective RPLM syntax element is a position in the temporary reference picture index list that contains an index value equal to an index value specified by the respective RPLM syntax element; and
        shifting, by one position, a set of index values in the temporary reference picture index list, wherein the set of index values starts with an index value at a position within the temporary reference picture index list identified by an index to a position of the respective RPLM syntax element in the ordered set of RPLM syntax elements, wherein the set of index values ends with the end position associated with the respective RPLM syntax element; and
    while a position indicator is less than the number of positions in the final version of the reference picture list:
        configuring the final version of the reference picture list such that a reference picture at a current position in the initial version of the reference picture list is assigned to a current position in the final version of the reference picture list, wherein the position indicator indicates the current position in the final version of the reference picture list and a position in the temporary reference picture index list of a current index value of the temporary reference picture index list, wherein the current index value of the temporary reference picture index list indicates the current position in the initial version of the reference picture list; and
        incrementing the position indicator.

4. The method of claim 1, further comprising, when a value of the RPLM syntax element is less than the particular value, obtaining, from a bitstream, a next RPLM syntax element in the ordered set of RPLM syntax elements.

5. The method of claim 1, wherein generating the final version of the reference picture list comprises, for each integer value of a position indicator from 0 to a value 1 less than the number of active reference pictures in the reference picture list:
    when a current RPLM syntax element is not equal to the particular value, assigning a reference picture at a current position in the initial version of the reference picture list equal to a current position in the final version of the reference picture list, wherein the position indicator indicates the current position in the final version of the reference picture list and a position of the current RPLM syntax element in the ordered set of RPLM syntax elements, wherein the current RPLM syntax element indicates the current position in the initial version of the reference picture list.

6. The method of claim 1, wherein when a bitstream that includes the ordered set of RPLM syntax elements does not include data that indicate a particular RPLM syntax element in the ordered set of RPLM syntax elements:
if the particular RPLM syntax element is the first RPLM syntax element in the ordered set of RPLM syntax elements, determining that a value of the particular RPLM syntax element is equal to 0, and
if the particular RPLM syntax element is not the first RPLM syntax element in the ordered set of RPLM syntax elements, determining that a value of the particular RPLM syntax element is equal to a value of a previous RPLM syntax element in the ordered set of RPLM syntax elements plus 1, modulo a total number of current picture order count values in the initial version of the reference picture list.

7. The method of claim 1, wherein when a bitstream that includes the ordered set of RPLM syntax elements does not include data that indicate a particular RPLM syntax element in the ordered set of RPLM syntax elements, determining that a value of the particular RPLM syntax element is equal to an index of the position in the ordered set of RPLM syntax elements of the particular RPLM syntax element modulo a total number of current picture order count values in the initial version of the reference picture list.

8. The method of claim 1, wherein the ordered set of RPLM syntax elements includes fewer RPLM syntax elements than a total number of reference pictures in the final version of the reference picture list.

9. A video decoding device comprising:
a storage medium configured to store video data; and
one or more processors configured to:
generate an initial version of a reference picture list;
determine that a reference picture list modification (RPLM) syntax element is a last RPLM syntax element in an ordered set of one or more RPLM syntax elements when the RPLM syntax element has a particular value;
generate a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element,
wherein the respective RPLM syntax element indicates a position in the initial version of the reference picture list of the reference picture associated with the respective RPLM syntax element, and
wherein the insertion position for the respective RPLM syntax element corresponds to a position in the ordered set of RPLM syntax elements of the respective RPLM syntax element; and
decode, based on a reference picture in the reference picture list, a block of the video data.

10. The video decoding device of claim 9, wherein the one or more processors are configured to:
determine a first reference picture set (RPS) subset, a second RPS subset, and a third RPS subset, wherein the first RPS subset includes short-term reference pictures that occur before a current picture in output order and are used for reference by the current picture, the second RPS subset includes short-term reference pictures that occur after the current picture in output order and are used for reference by the current picture, the third RPS subset includes long-term reference pictures used for reference by the current picture; and
generate, based on the first, second, and third RPS subsets, the initial version of the reference picture list,
wherein the particular value is equal to a total number of reference pictures in a set of reference pictures that includes the first, second, and third RPS subsets.

11. The video decoding device of claim 9, wherein to generate the final version of the reference picture list, the one or more processors:
generate a temporary reference picture index list;
for each respective RPLM syntax element in the ordered set of RPLM syntax elements that is less than the particular value, the one or more processors:
determine an end position associated with the respective RPLM syntax element, wherein the end position associated with the respective RPLM syntax element is a position in the temporary reference picture index list that contains an index value equal to an index value specified by the respective RPLM syntax element; and
shift, by one position, a set of index values in the temporary reference picture index list, wherein the set of index values starts with an index value at a position within the temporary reference picture index list identified by an index to a position of the respective RPLM syntax element in the ordered set of RPLM syntax elements, wherein the set of index values ends with the end position associated with the respective RPLM syntax element; and
while a position indicator is less than the number of positions in the final version of the reference picture list:
configure the final version of the reference picture list such that a reference picture at a current position in the initial version of the reference picture list is assigned to a current position in the final version of the reference picture list, wherein the position indicator indicates the current position in the final version of the reference picture list and a position in the temporary reference picture index list of a current index value of the temporary reference picture index list, wherein the current index value of the temporary reference picture index list indicates the current position in the initial version of the reference picture list; and
increment the position indicator.

12. The video decoding device of claim 9, wherein the one or more processors are configured such that when a value of the RPLM syntax element is less than the particular value, the one or more processors obtain, from a bitstream that includes the ordered set of RPLM syntax elements, a next RPLM syntax element in the ordered set of RPLM syntax elements.

13. The video decoding device of claim 9,
wherein to generate the final version of the reference picture list, the one or more processors are configured such that for each integer value of a position indicator from 0 to a value 1 less than the number of active reference pictures in the reference picture list, the one or more processors assign, when a current RPLM syntax element is not equal to the particular value, a reference picture at a current position in the initial version of the reference picture list equal to a current position in the final version of the reference picture list, wherein the position indicator indicates the current position in the final version of the reference picture list and a position of the current RPLM syntax element in the ordered set of RPLM syntax elements, wherein the current RPLM syntax element indicates the current position in the initial version of the reference picture list.

14. The video decoding device of claim 9, wherein when a bitstream that includes the ordered set of RPLM syntax elements does not include data that indicate a particular RPLM syntax element in the ordered set of RPLM syntax elements:
if the particular RPLM syntax element is the first RPLM syntax element in the ordered set of RPLM syntax elements, the one or more processors determine that a value of the particular RPLM syntax element is equal to 0, and
if the particular RPLM syntax element is not the first RPLM syntax element in the ordered set of RPLM syntax elements, the one or more processors determine that a value of the particular RPLM syntax element is equal to a value of a previous RPLM syntax element in the ordered set of RPLM syntax elements plus 1, modulo a total number of current picture order count values in the initial version of the reference picture list.

15. The video decoding device of claim 9, wherein when a bitstream that includes the ordered set of RPLM syntax elements does not include data that indicate a particular RPLM syntax element in the ordered set of RPLM syntax elements, the one or more processors determine that a value of the particular RPLM syntax element is equal to an index of the position in the ordered set of RPLM syntax elements of the particular RPLM syntax element modulo a total number of current picture order count values in the initial version of the reference picture list.

16. The video decoding device of claim 9, wherein the ordered set of RPLM syntax elements includes fewer RPLM syntax elements than a total number of reference pictures in the final version of the reference picture list.

17. A video decoding device comprising:
means for generating an initial version of a reference picture list;
means for determining that a reference picture list modification (RPLM) syntax element is a last RPLM syntax element in an ordered set of one or more RPLM syntax elements when the RPLM syntax element has a particular value;
means for generating a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element,
wherein the respective RPLM syntax element indicates a position in the initial version of the reference picture list of the reference picture associated with the respective RPLM syntax element, and
wherein the insertion position for the respective RPLM syntax element corresponds to a position in the ordered set of RPLM syntax elements of the respective RPLM syntax element; and
means for decoding, based on a reference picture in the reference picture list, a block of video data.

18. A non-transitory computer-readable data storage medium that stores instructions that, when executed, configure a video decoding device to:
generate an initial version of a reference picture list;
determine that a reference picture list modification (RPLM) syntax element is a last RPLM syntax element in an ordered set of one or more RPLM syntax elements when the RPLM syntax element has a particular value;
generate a final version of the reference picture list, wherein for each respective RPLM syntax element in the ordered set of RPLM syntax elements that does not have the particular value, the final version of the reference picture list includes, at an insertion position for the respective RPLM syntax element, a reference picture associated with the respective RPLM syntax element,
wherein the respective RPLM syntax element indicates a position in the initial version of the reference picture list of the reference picture associated with the respective RPLM syntax element, and
wherein the insertion position for the respective RPLM syntax element corresponds to a position in the ordered set of RPLM syntax elements of the respective RPLM syntax element; and
decode, based on a reference picture in the reference picture list, a block of video data.

19. A method of encoding video data, the method comprising:
generating an ordered set of one or more reference picture list modification (RPLM) syntax elements, wherein for each respective RPLM syntax element in the ordered set of RPLM syntax elements:
when the respective RPLM syntax element is a last RPLM syntax element in the ordered set of RPLM syntax elements, the respective RPLM syntax element has a particular value,
when the respective RPLM syntax element does not have the particular value, the respective RPLM syntax element indicates that a final version of a reference picture list includes, at an insertion position for the respective RPLM syntax element, a particular reference picture,
wherein the respective RPLM syntax element indicates a position, within an initial version of the reference picture list, of the particular reference picture, and
wherein the insertion position for the respective RPLM syntax element corresponds to a position in the ordered set of RPLM syntax elements of the respective RPLM syntax element; and
generating a bitstream for the video data, the bitstream including the ordered set of one or more RPLM syntax elements.

20. The method of claim 19, wherein:
wherein a current picture is associated with a first reference picture set (RPS) subset, a second RPS subset, and a third RPS subset, wherein the first RPS subset includes short-term reference pictures that occur before the current picture in output order and are used for reference by the current picture, the second RPS subset includes short-term reference pictures that occur after the current picture in output order and are used for reference by the current picture, the third RPS subset includes long-term reference pictures used for reference by the current picture; and
the particular value is equal to a total number of reference pictures in a set of reference pictures that includes the first, second, and third RPS subsets.

21. The method of claim 19, wherein the ordered set of RPLM syntax elements includes fewer RPLM syntax elements than the total number of reference pictures in the final version of the reference picture list.

22. The method of claim 19, wherein for each respective RPLM syntax element in the ordered set of RPLM syntax elements, when the respective RPLM syntax element does not specify the particular value, the respective RPLM syntax element specifies an index to the position indicated by the respective RPLM syntax element.

23. A video encoding device comprising:
one or more storage media configured to store video data and
one or more processors configured to:
generate an ordered set of one or more reference picture list modification (RPLM) syntax elements, wherein for each respective RPLM syntax element in the ordered set of RPLM syntax elements:
when the respective RPLM syntax element is a last RPLM syntax element in the ordered set of RPLM syntax elements, the respective RPLM syntax element has a particular value,
when the respective RPLM syntax element does not have the particular value, the respective RPLM syntax element indicates that a final version of a reference picture list includes, at an insertion position for the respective RPLM syntax element, a particular reference picture,
wherein the respective RPLM syntax element indicates a position, within an initial version of the reference picture list, of the particular reference picture, and
wherein the insertion position for the respective RPLM syntax element corresponds to a position in the ordered set of RPLM syntax elements of the respective RPLM syntax element; and
generate a bitstream for the video data, the bitstream including the ordered set of one or more RPLM syntax elements.

24. The video encoding device of claim 23, wherein:
wherein a current picture is associated with a first reference picture set (RPS) subset, a second RPS subset, and a third RPS subset, wherein the first RPS subset includes short-term reference pictures that occur before the current picture in output order and are used for reference by the current picture, the second RPS subset includes short-term reference pictures that occur after the current picture in output order and are used for reference by the current picture, the third RPS subset includes long-term reference pictures used for reference by the current picture; and
the particular value is equal to a total number of reference pictures in a set of reference pictures that includes the first, second, and third RPS subsets.

25. The video encoding device of claim 23, wherein the ordered set of RPLM syntax elements includes fewer RPLM syntax elements than the total number of reference pictures in the final version of the reference picture list.

26. The video encoding device of claim 23, wherein for each respective RPLM syntax element in the ordered set of RPLM syntax elements, when the respective RPLM syntax element does not specify the particular value, the respective RPLM syntax element specifies an index to the position indicated by the respective RPLM syntax element.

27. A video encoding device comprising:
means for generating an ordered set of one or more reference picture list modification (RPLM) syntax elements, wherein for each respective RPLM syntax element in the ordered set of RPLM syntax elements:
when the respective RPLM syntax element is a last RPLM syntax element in the ordered set of RPLM syntax elements, the respective RPLM syntax element has a particular value,
when the respective RPLM syntax element does not have the particular value, the respective RPLM syntax element indicates that a final version of a reference picture list includes, at an insertion position for the respective RPLM syntax element, a particular reference picture,
wherein the respective RPLM syntax element indicates a position, within an initial version of the reference picture list, of the particular reference picture, and
wherein the insertion position for the respective RPLM syntax element corresponds to a position in the ordered set of RPLM syntax elements of the respective RPLM syntax element; and
means for generating a bitstream for the video data, the bitstream including that includes the ordered set of one or more RPLM syntax elements.

28. A non-transitory computer-readable data storage medium that stores instructions that, when executed, configure a video encoding device to:
generate an ordered set of one or more reference picture list modification (RPLM) syntax elements, wherein for each respective RPLM syntax element in the ordered set of RPLM syntax elements:
when the respective RPLM syntax element is a last RPLM syntax element in the ordered set of RPLM syntax elements, the respective RPLM syntax element has a particular value,
when the respective RPLM syntax element does not have the particular value, the respective RPLM syntax element indicates that a final version of a reference picture list includes, at an insertion position for the respective RPLM syntax element, a particular reference picture,
wherein the respective RPLM syntax element indicates a position, within an initial version of the reference picture list, of the particular reference picture, and
wherein the insertion position for the respective RPLM syntax element corresponds to a position in the ordered set of RPLM syntax elements of the respective RPLM syntax element; and
generate a bitstream for the video data, the bitstream including the ordered set of one or more RPLM syntax elements.

* * * * *